(12) United States Patent
Asada et al.

(10) Patent No.: US 7,038,989 B2
(45) Date of Patent: May 2, 2006

(54) HIGH-FREQUENCY SUPERIMPOSING METHOD AND OPTICAL DISK APPARATUS USING IT

(75) Inventors: Akihiro Asada, Chigasaki (JP); Masaaki Kurebayashi, Ebina (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 429 days.

(21) Appl. No.: 10/281,274

(22) Filed: Oct. 28, 2002

(65) Prior Publication Data

US 2003/0117923 A1    Jun. 26, 2003

(30) Foreign Application Priority Data

Dec. 20, 2001   (JP) .............................. 2001-386925

(51) Int. Cl.
G11B 7/045   (2006.01)

(52) U.S. Cl. .................................... 369/59.11; 369/116

(58) Field of Classification Search ............ 369/59.11, 369/116, 47.53; G11B 7/045, 7/45, 7/00
See application file for complete search history.

(56) References Cited

U.S. PATENT DOCUMENTS

| | | | | |
|---|---|---|---|---|
| 5,127,015 | A | * | 6/1992 | Chikugawa et al. ..... 372/29.01 |
| 5,386,409 | A | * | 1/1995 | Yokota et al. .............. 369/116 |
| 5,590,111 | A | * | 12/1996 | Kirino et al. ............. 369/47.53 |
| 6,104,685 | A | * | 8/2000 | Saga et al. ................ 369/59.11 |
| 6,345,062 | B1 | * | 2/2002 | Taguchi et al. .......... 372/38.01 |
| 6,421,314 | B1 | * | 7/2002 | Maruyama .................. 369/116 |
| 6,426,930 | B1 | * | 7/2002 | Tanaka et al. ........... 369/59.12 |
| 6,584,054 | B1 | * | 6/2003 | Furukawa et al. ........ 369/59.11 |
| 6,731,584 | B1 | * | 5/2004 | Nagara ....................... 369/116 |

FOREIGN PATENT DOCUMENTS

| | | |
|---|---|---|
| JP | 63-136331 | 6/1988 |
| JP | 03-003126 | 1/1991 |
| JP | 5-73948 | * 3/1993 |
| JP | 07-098895 | 4/1995 |
| JP | 07-210909 | 8/1995 |
| JP | 2000-163782 | 6/2000 |
| JP | 2001-0009422 | 2/2001 |
| KR | 10-0314107 | 4/1995 |

OTHER PUBLICATIONS

Japanese Patent Office Action; Application No. 2001-386925; Feb. 8, 2005.

* cited by examiner

*Primary Examiner*—A M Psitos
(74) *Attorney, Agent, or Firm*—McDermott Will & Emery LLP

(57) ABSTRACT

An optical disk drive includes drive current generation unit for supplying a mark forming semiconductor laser drive current and a space forming semiconductor laser drive current; first high-frequency superimposition unit for superimposing a high-frequency component on the space forming semiconductor laser drive current; and high-frequency superimposition control unit for controlling the first high-frequency superimposition unit to stop the superimposition of the high-frequency component for a predetermined duration prior to a timing at which to switch from the space forming semiconductor laser drive current to the mark forming semiconductor laser drive current, eliminating positional variations on the disk of the mark leading and trailing edges due to the high frequency superimposition.

7 Claims, 22 Drawing Sheets

SUPERIMPOSING A HIGH-FREQUENCY COMPONENT ON A SEMICONDUCTOR LASER DRIVE CURRENT IS SHOWN TO VARY THE DRIVE CURRENT CHANGE TIMING DEPENDING ON THE PHASE OF THE HIGH-FREQUENCY COMPONENT

THERE ARE VARIATIONS IN SUPPLIED OPTICAL ENERGY AT THE MARK LEADING EDGE DUE TO PHASE VARIATIONS IN HIGH-FREQUENCTY COMPONENT AND MARK FORMING DRIVE CURRENT START TIMING; LASER OSCILLATION DELAY CAUSES A DELAY IN THE MARK FORMING LIGHT OUTPUT

HIGH FREQUENCY SUPERIMPOSITION IS STOPPED A Toff TIME BEFORE THE MARK FORMING LASER DRIVE CURRENT START TIMING (POINT P) ACCORDING TO THIS INVENTION CONFIGURATION OF 1st EMBODIMENT
(HF SUPERIMPOSED IN SPACE PERIODS : CD-R CASE)

CONFIGURATION OF SEMICONDUCTOR
LASER DRIVER 14

CONFIGURATION OF WRITE STRATEGY & HF ON/OFF CONTROLLER 13-1 IN 1st EMBODIMENT

CONFIGURATION OF SECOND EMBODIMENT
(HF SUPERIMPOSED IN SPACE & MARK PERIODS)

TIMING DIAGRAM SHOWING OPERATION OF WRITE STRATEGY & HF ON/OFF CONTROLLER 13-2 IN 2nd EMBODIMENT

TIMING DIAGRAM SHOWING HF ON/OFF OPERATION IN 2ND EMBODIMENT (CD-R CASE)

TIMING DIAGRAM SHOWING HF ON/OFF
OPERATION IN 2nd EMBODIMENT (CD-RW CASE)

CONFIGURATION OF HIGH-FREQUENCY COMPONENT GENERATION CIRCUIT (HFM) 15-2 IN 3rd EMBODIMENT

FIG. 18 TIMING DIAGRAM SHOWING OPERATION OF HF DUTY CONTROL BY HIGH-FREQUENCY COMPONENT GENERATION CIRCUIT (HFM) 15-2 IN 3rd EMBODIMENT

TIMING DIAGRAM SHOWING HF ON/OFF OPERATION IN 3RD EMBODIMENT (CD-R CASE)

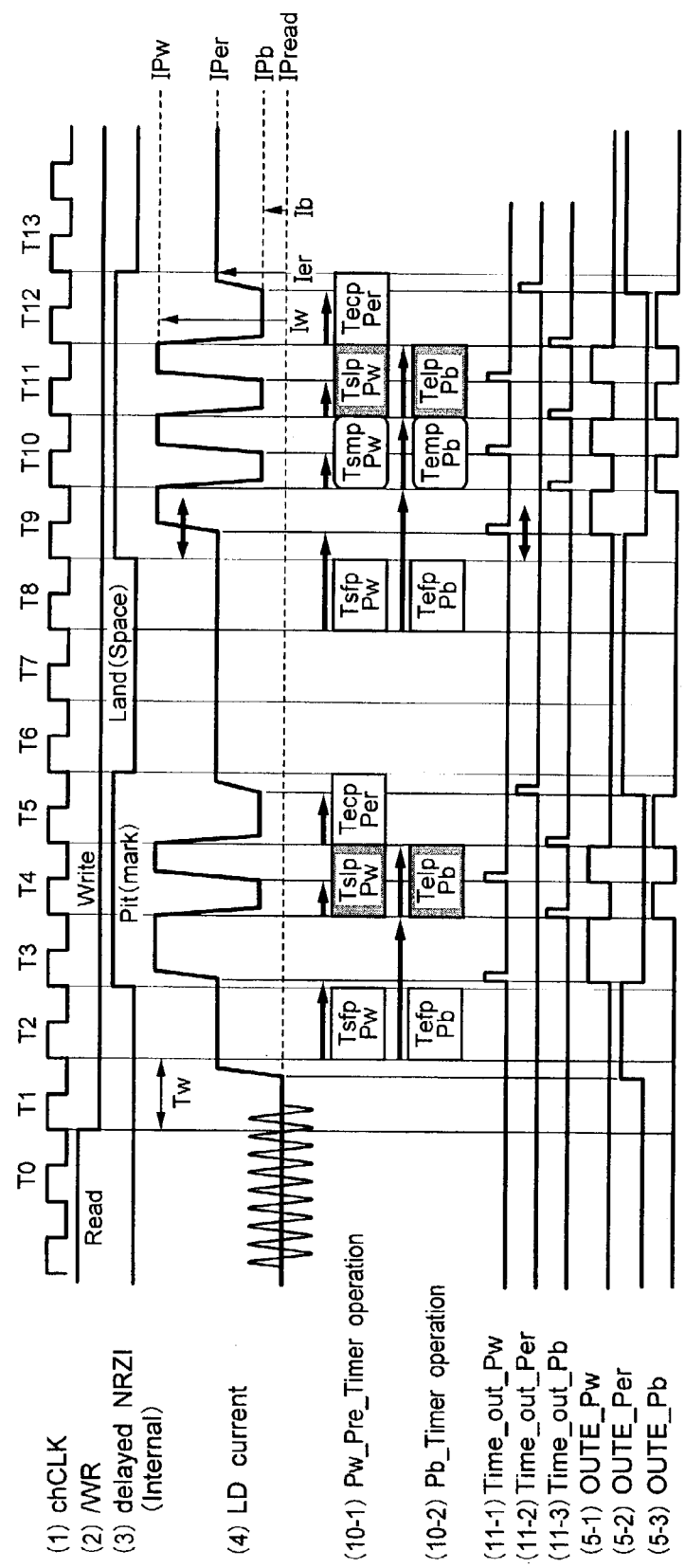

HIGH-FREQUENCY SUPERIMPOSING METHOD AND OPTICAL DISK APPARATUS USING IT

BACKGROUND OF THE INVENTION

1. Field of the Invention

The present invention relates to a high-frequency superimposing method for superimposing a high-frequency component on a semiconductor laser drive current when recording information on an optical disk in an optical disk drive and to an optical disk drive using the high-frequency superimposing method. More specifically, the present invention relates to a high-frequency superimposing method capable of high-speed, high-density recording and an optical disk drive using the same.

2. Description of the Related Art

Among recordable optical disks there are write-once type optical disks that allow the user to record data only once (e.g., CD-R and DVD-R) and rewritable type optical disks that permit rewriting a number of times (e.g., CD-RW and DVD-RW).

To start recording data, the optical disk drive needs to position its optical head at a desired track (groove) on a disk and start recording from a desired position (tangential direction position). This positioning of the head is done by reading address information marked in advance on the disk. To make the drive compatible with read-only disks (CD-ROMs and DVD-ROMs), address information corresponding to the recording position on the disk is added to user data when the user data is recorded on the disk.

In the case of CD-R and CD-RW, the address information on the disk is formed in units of frame (equivalent to $1/75$ second for a normal speed playback) by slightly wobbling the groove in a radial direction (a reproduced signal from the wobbled groove is hereinafter referred to as a wobble signal) and modulating a wobble frequency. In the case of DVD-R and DVD-RW, although the groove is slightly wobbled in the radial direction, the wobble frequency is not modulated. Instead, tiny dents called land pre-pits (LPPs) are located at predetermined positions along the groove wobble so that the presence or absence of these pits forms address information.

To recognize positions on the disk correctly for information recording, the groove wobble must be read (i.e., address information must be identified) with high precision also during recording. However, since a semiconductor laser is affected by a reflected light from the disk, a resonance state of the interior of the semiconductor changes, resulting in a change in its laser power. That is, a so-called optical feedback causes noise. Semiconductor lasers capable of generating a high output, in particular, are more likely to be affected by the optical feedback than read-only semiconductor lasers with a low output (High-power semiconductor lasers have a reduced reflectivity at the laser end facet to allow an increased power to be output to the outside. Hence, the reflected light easily enters through this end facet into an oscillation portion in the interior of the laser, changing the resonance state and making it more likely for noise to occur.)

To reduce noise of such a semiconductor laser there has been a high-frequency superimposing method that involves superimposing a high-frequency component on a drive current of the semiconductor laser. For example, U.S. Pat. No. 6,421,314 discloses a method in which not only is a high-frequency signal superimposed on a semiconductor laser drive current during playback but the high-frequency signal of an optimum frequency and/or amplitude for forming spaces (erasing) and marks is superimposed during recording by using a common high-frequency superimposing circuit.

SUMMARY OF THE INVENTION

As described above, it has been a conventional practice to superimpose a high-frequency component on a semiconductor laser drive current to reduce noise caused by optical feedback.

However, when a recording current, which is based on the semiconductor laser drive current superimposed with a high-frequency component, is supplied, the leading edge position or trailing edge position of the recording current may get shifted due to the effects of the high-frequency component, resulting in the mark leading or trailing edge position on the disk being shifted. This problem becomes more significant as pit miniaturization proceeds to meet requirements for higher recording density of the recordable optical disks or as the recording speed increases.

In an optical disk drive using a method of reducing noise of optical feedback by superimposing a high-frequency component, it is an object of the present invention to provide a recording method and an optical disk drive which can reduce adverse effects of high-frequency components during data recording.

These problems can be solved by the following means. That is, (1) An optical disk drive for recording information by forming marks or spaces on an optical disk, comprising: a drive current generation unit for supplying a mark forming semiconductor laser drive current and a space forming semiconductor laser drive current, the mark forming semiconductor laser drive current having a drive waveform corresponding to a mark length and having a plurality of levels of current value, the space forming semiconductor laser drive current having at least one level of current value; a first high frequency superimposition unit for superimposing a high-frequency component on the space forming semiconductor laser drive current; and a high frequency superimposition control unit for controlling the first high frequency superimposition unit to stop the superimposition of the high-frequency component for a predetermined duration prior to a timing at which to switch from the space forming semiconductor laser drive current to the mark forming semiconductor laser drive current.

(2) An optical disk recording method for recording an optical disk by radiating a laser light from a laser diode onto the optical disk, the method comprising: a first step of supplying to the laser diode a current produced by high-frequency-superimposing a first current; a second step of supplying to the laser diode the first current not high-frequency-superimposed; and a third step of supplying to the laser diode a second current larger than the first current; wherein the first step plays back address information on the optical disk and the third step records data on the optical disk.

Other objects, features and advantages of the invention will become apparent from the following description of the embodiments of the invention taken in conjunction with the accompanying drawings.

BRIEF DESCRIPTION OF THE DRAWINGS

FIG. 22 illustrates a timing diagram (in the case of CD-RW) showing an operation of the write strategy & high frequency superimposition control circuit 13-2 in the first embodiment.

DETAILED DESCRIPTION OF THE EMBODIMENTS

Figure 1:
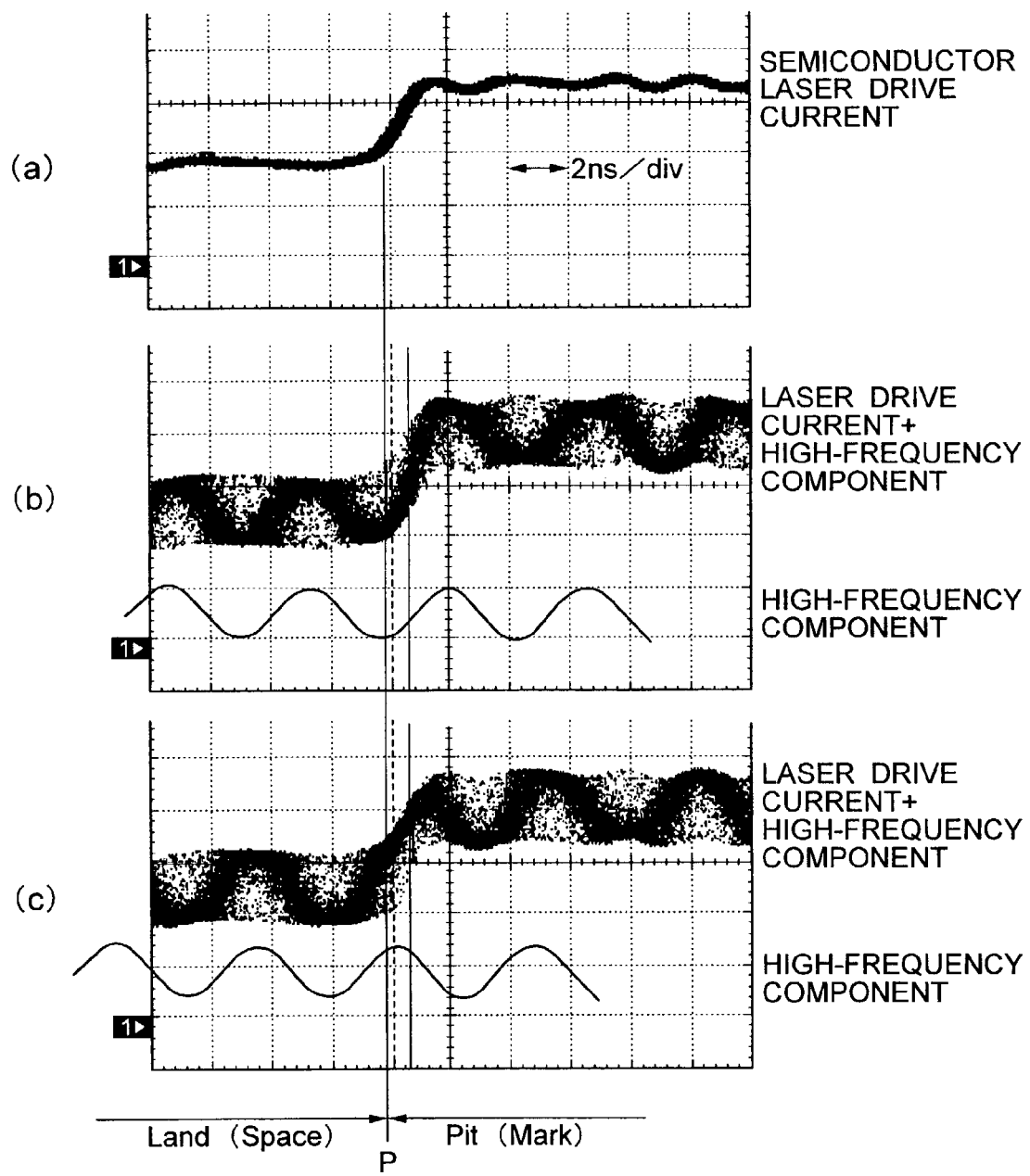
FIG. 1 is diagrams showing how superimposing a high-frequency component on a semiconductor laser drive current changes a change timing of the semiconductor laser drive current depending on the phase of the high-frequency component.

When the recording speed and density of recordable optical disks are increased, variations in mark leading edge position and mark trailing edge position pose a serious problem. First, the cause of this problem is discussed in the following.

Information (or data) to be recorded on a disk is recorded according to a binarized modulation signal, as with the EFM modulation and 8–16 modulation. Of the two values, one corresponds to a pit (mark) and the other a land (space), and pits (marks) are formed on the disk to record data. The lengths of pit (mark) and land (space) are multiples of a period or cycle Tw of a recording reference clock (also referred to as chCLK), and the shortest lengths in the case of the EFM modulation and 8–16 modulation are 3 Tw. A pit (mark) of a length corresponding to the modulation signal to be recorded (also referred to as an NRZ signal) needs to be formed on a disk.

However, when this modulation signal is used to emit a laser beam, the following problem occurs. That is, because a spot size of the laser beam on the disk surface is equivalent to the shortest mark length (3 Tw) and because, as described above, both the write-once disk and re-writable disk utilize heat changes in the recording layer caused by the application of the laser beam and thus the recording layer itself tends to built up and disperse heat, the length of the pit (mark) and positions of the leading and trailing edges of the pit (mark) on the disk may differ from the desired ones. As a result, jitter occurs during playback, increasing a playback error rate.

To deal with this problem, a recording correction generally called a write strategy has conventionally been employed during recording. More specifically, the laser beam emission start timing and end timing to form a mark are changed according to the mark length to obtain desired mark leading edge position and mark trailing edge position. Another write strategy currently in use considers the thermal effect of the land (space) period. This write strategy corrects the laser beam emission start timing according to a combination of the preceding space length and the length of the mark being formed and also the laser beam emission end timing according to a combination of the length of the mark being formed and the subsequent space length. These timing corrections (edge corrections) are carried out in units of 1/20 to 1/30 of the recording reference clock cycle Tw.

In the case of CD-R, the recording speed, which was a normal to 4-time speed until a few years ago, is now a 10 to 16-time speed and will further increase to a 24 to 32-time speed. As for DVD, the recording speed is currently an 1 to normal-time speed and expected to approach a 4 to 8-time speed. Reference clock frequencies fchCLK (cycle Tw) for these recording speeds are fchCLK=43.218 MHz (Tw=23 ns) for CD with the 10-time speed, 138.3 MHz (7.2 ns) for the 32-time speed for CD, 26.16 MHz (38.2 ns) for DVD with the normal speed, 104.6 MHz (9.6 ns) for the 4-time speed for DVD, and 209.3 MHz (4.8 ns) for the 8-time speed for DVD. At these recording speeds, one-step durations (in the case of Tw/20) in the recording pulse edge correction by the so-called write strategy are 1.2 ns for the 10-time speed for CD, 0.36 ns for the 32-time speed for CD, 1.9 ns for the normal speed for DVD, 0.48 ns for the 4-time speed for DVD, and 0.24 ns for the 8-time speed for DVD. As the recording speed increases and the one-step duration in the recording pulse edge correction decreases, variations in the recording pulse edge that have presented no problem at low recording speeds can no longer be ignored.

One of the causes for the recording pulse edge variations is influence of high-frequency components superimposed during recording. There are the following three types of influences from the high-frequency components.

(1) Variations or shifts of the edge of a recording current that drives a semiconductor laser (2) Edge shifts of a recording light pulse caused by delays of semiconductor laser oscillations (3) Variations of supplied light energy at the mark leading edge caused by variations of interval between a high-frequency-superimposed light pulse and a recording light pulse These are caused by differences between an optimum frequency of the high-frequency component and the recording reference clock frequency, i.e. by variations in the phase of the high-frequency component with respect to the edge position of the mark recording current.

FIG. 1 shows how an edge of the semiconductor laser drive current varies (cause (1) listed above). In this example a high-frequency component is shown added in a direct current, rather than an alternating current, manner. (a) of FIG. 1 represents a semiconductor laser drive current not superimposed with a high-frequency component. In the diagram, the drive current increases in amplitude at point P to record a mark (this point P is also called a leading edge of the recording current). (b) and (c) of FIG. 1 represent recording currents superimposed with a high-frequency component. These diagrams are prepared using photographs taken with multiple exposures and thus the current waveforms are shown to have some width due to phase shifts of the high-frequency component and the mark recording current edge (at point P). (b) represents a case where the high-frequency component was minimum in magnitude at point P (or where it frequently assumed the minimum value at point P), and (c) represents a case where the high-frequency component was maximum in magnitude at point P (or where it often assumed the maximum value at point P). As can be seen from comparison between (b) and (c), a phase shift of the high-frequency component at point P causes the leading edge position of the current waveform superimposed with the high-frequency component to change. The comparison between (b) and (c) shows that the edge positional shift is as large as about 1 ns pp (peak-to-peak), greater than the one-step duration in the edge correction by the write strategy described earlier (0.36 ns for the 32-time speed for CD and 0.24 ns for the 8-time speed for DVD). This shift increases as the high-frequency component increases in amplitude and decreases in frequency. While in this diagram the mark recording start point has been described, the similar change or shift occurs also at the mark recording end point.

Figure 2:
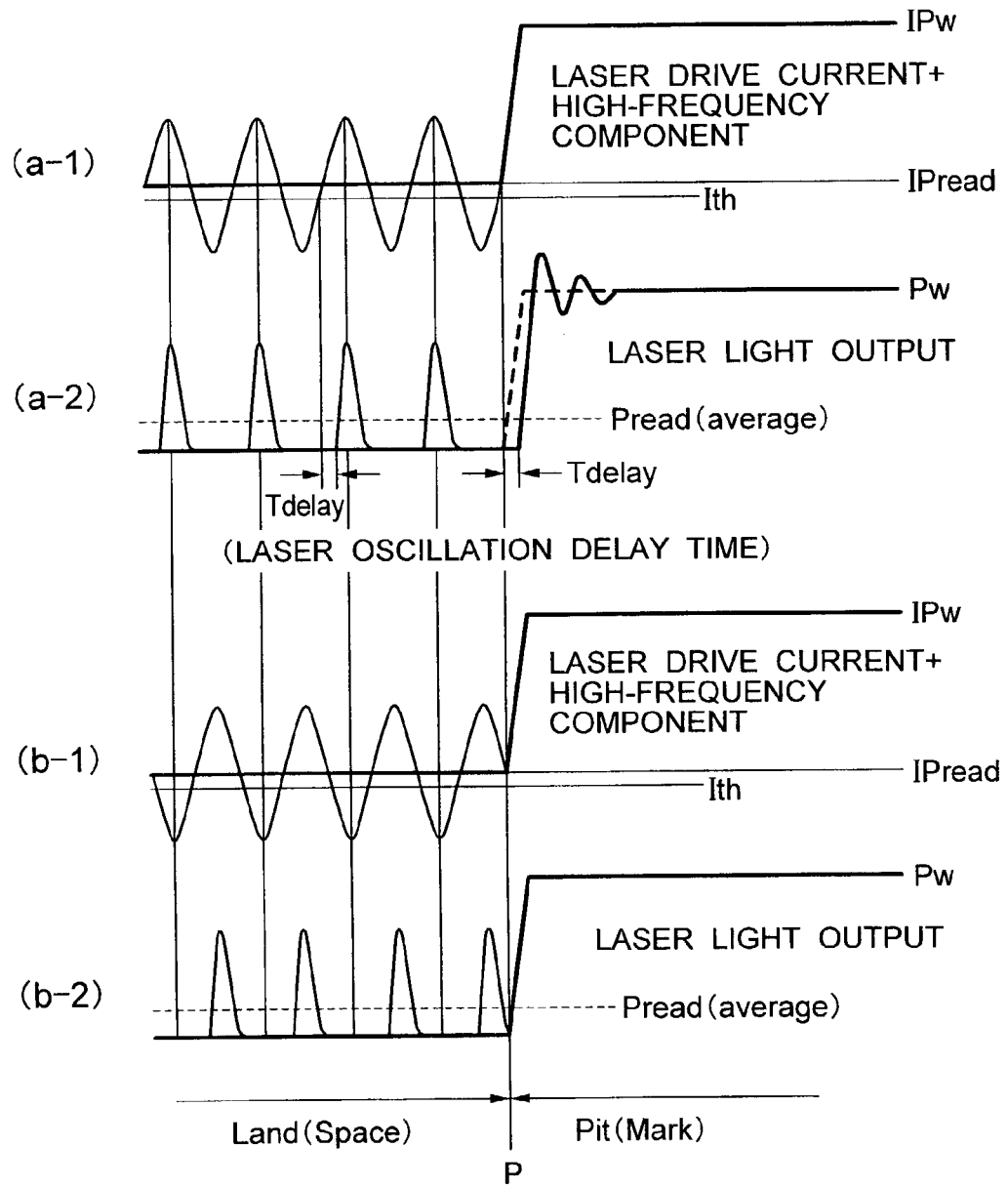
FIG. 2 is diagrams showing high-frequency components, a change of a supplied beam energy at the start of a mark caused by a phase change in a mark forming drive current start timing, and how a mark forming beam output is delayed by a delay in the semiconductor laser oscillation.

An edge shift of the recording light pulse due to a delay in the semiconductor laser oscillation (cause (2) and (3) above) will be explained by referring to FIG. 2. FIG. 2 shows the relation between a semiconductor laser drive current and a light output when a space changes to a mark on CD-R and DVD-R. A high-frequency component is shown superimposed in an alternating current manner. In the figure, (a) represents a case where the high-frequency component returns from a negative side to zero at point P (the leading edge position of the mark recording current), and (b) represents a case where the high-frequency component returns from a positive side to zero at point P. In both cases the superimposition of the high-frequency component was stopped after the point P (in the mark forming duration or period).

Next, an operation before the point P in a space duration or period (a narrow pulse train formed by high frequency superimposition) will be described. In the space (land) duration before point P in CD-R and DVD-R, a high frequency superimposition is performed to read a wobble signal, address information and a servo signal with high S/N (signal-to-noise ratio) and to drive the semiconductor laser so that an average light power is equivalent to that during the normal playback. At this time, assuming that Ith denotes an oscillation threshold current of the semiconductor laser, the semiconductor laser drive current is changed from less than Ith to over Ith by superimposing a high-frequency component and then returned to less than Ith in order to produce narrow light pulses.

In more concrete terms, when the drive current is rapidly changed from below Ith to over Ith, the semiconductor laser starts oscillation with a time delay (The semiconductor laser does not immediately initiate oscillation when the drive current exceeds Ith). The lesser (or the greater, the amplitude of high-frequency component to be superimposed), the drive current value less than Ith becomes (or the greater, the amplitude of high-frequency components becomes), the greater, the oscillation delay time becomes. Normally, the oscillation delay time is on the order of 1–2 ns. A high power semiconductor laser, when turned on, starts oscillating with a relaxation oscillation. A spectrum of the laser beam has a plurality of frequency components (called a multimode), rather than a single frequency (a single mode). After the relaxation oscillation, the laser changes to a single mode. The high frequency superimposition takes advantage of this oscillation delay to stop oscillation (emission) during the relaxation oscillation period to emit narrow light pulses having a plurality of frequency components and thereby alleviate influences of the optical feedback.

Next, an outputting of light after the point P in a mark forming duration or period (edge delay of a recording light pulse) will be explained. As described above, when the drive current is changed rapidly from below Ith to over Ith, the semiconductor laser starts oscillation (i.e., produces light) with a time delay. The oscillation delay time varies depending on how much the current value immediately before a start point of the mark forming drive current is less than Ith or higher than Ith, thus changing the timing at which to start outputting the mark forming light (i.e., start oscillating and producing light).

In the case of (a-1) and (a-2) of FIG. 2, the drive current changes from below Ith to IPw and therefore an oscillation delay occurs, delaying the timing at which to start outputting a mark forming light as during the high frequency superimposition. In the case of (b-1) and (b-2), the drive current changes from Ith to IPw and thus the semiconductor laser performs a linear operation (in which the power of emitted light is proportional to the drive current) and does not cause an oscillation delay such as observed in (a-1) and (a-2).

Since the start timing of the mark forming drive current (point P) and the high-frequency component are not synchronous, the value of the high-frequency component at point P and immediately before that point changes randomly, resulting in random variations in the mark forming light output start timing.

Here, variations of supplied light energy at the mark leading edge caused by variations of interval between a high-frequency-superimposed light pulse and a recording light pulse will be explained. In FIG. 2, when viewed from the standpoint of supplied light energy near the mark forming light output start timing, the interval between the high-frequency-superimposed light pulse and the mark forming light pulse is wide in the case of (a-1) and (a-2). In the case of (b-1) and (b-2), the interval between the high-frequency-superimposed light pulse and the mark forming light pulse is narrow. That is, the high-frequency-superimposed light pulse and the mark forming light pulse are very close to each other. This difference between the two cases results in a difference in the light energy supplied to the disk when starting to form a mark. This means that the position of the leading edge of a mark formed on the disk can randomly change depending on the phase of the high-frequency component. Particularly in the case of (a-1) and (a-2), since the supplied energy is small and the timing at which to start producing a mark forming light pulse is delayed by the oscillation delay, the leading edge of a mark on the disk shifts backward in time when compared with the case of (b-1) and (b-2).

It has been shown above that the mark start position on a disk is changed by a random change in the phase relation between a high-frequency component and a mark forming drive current start position that is caused by the superimposition of the high-frequency component. That is, (1) when a high-frequency component is superimposed near (before or after) the mark forming drive current start position, the leading edge of the mark forming drive current itself varies in phase. Even if the superimposition of a high-frequency component is stopped at the mark forming drive current start position, (2) the oscillation delay varies according to the value of the directly preceding high-frequency component, changing the mark forming light output start timing. Further, (3) the supplied light energy near the mark forming light output start timing is changed by the variation of the phase relation between the high-frequency component and the mark recording drive current. These variations in turn randomly change the mark start position on the disk, causing jitter during playback. An influence of jitter-induced degradation becomes large particularly during high-speed recording. What has been described above similarly holds also for the mark end position.

Embodiments of the present invention will be described with reference to the accompanying drawings.

EMBODIMENT 1

A first embodiment presents an example in which a high-frequency component is superimposed on a space duration during recording by a first high frequency superimposition control circuit (HF on/off control circuit) which controls an operation of starting and stopping superimposition of a high-frequency component. In this embodiment the recording of CD-R, for example, is contemplated.

Figure 4:
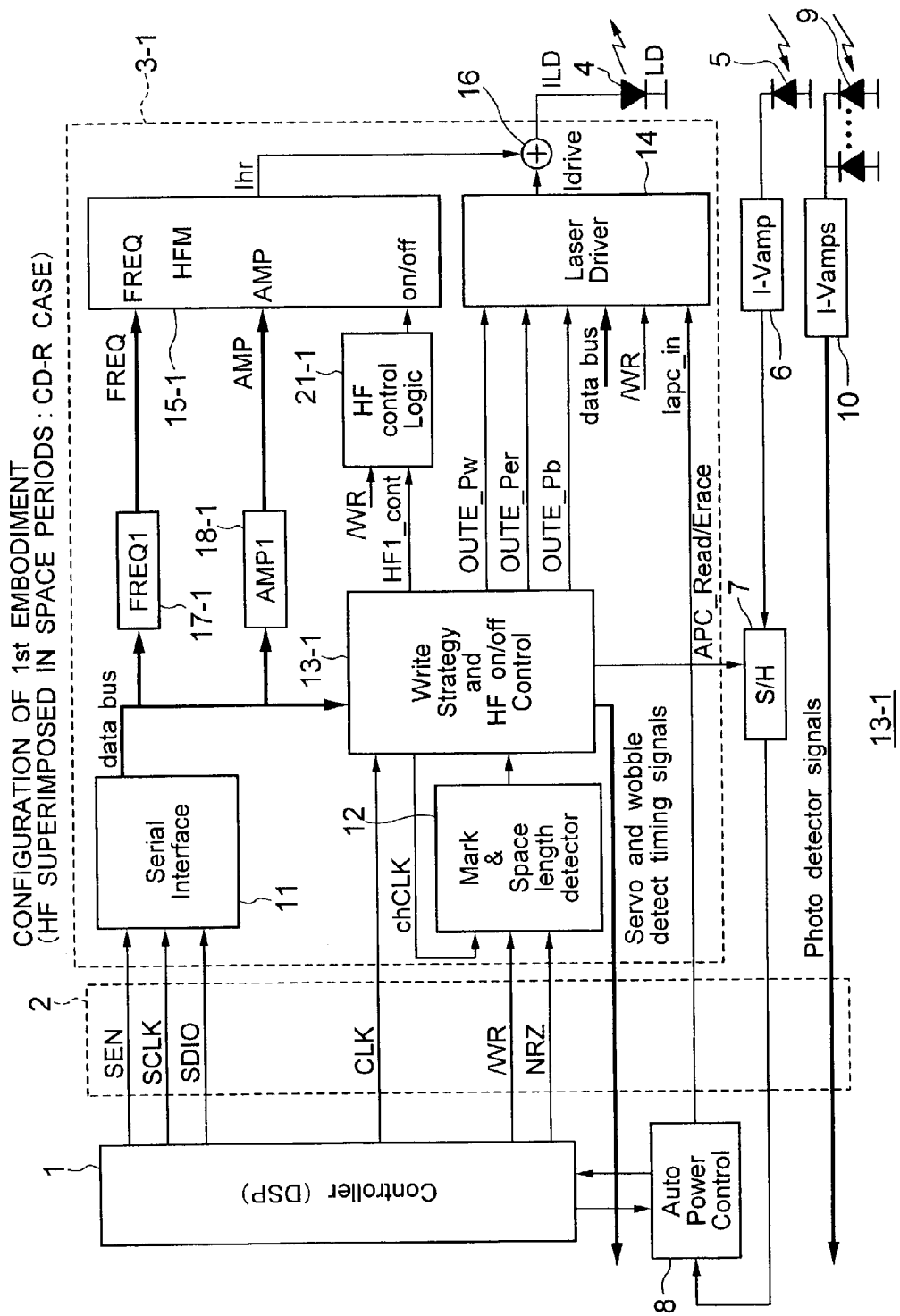
FIG. 4 illustrates a configuration of a first embodiment (where a high frequency is superimposed during a space period).

FIG. 4 shows a configuration of the first embodiment. Reference numeral 1 represents a controller (DSP), 2 a flexible cable, and 3-1 a semiconductor laser drive circuit incorporating a write strategy. Denoted 4 is a semiconductor laser diode, 5 a front monitor light receiving element for monitoring an output power of the semiconductor laser diode, 6 a current-voltage conversion circuit for converting an output current of the front monitor light receiving element 5 into a voltage, 7 a sample/hold circuit for sampling and holding an output of the current-voltage conversion circuit 6 at a predetermined timing, 8 an auto read power controller for controlling an output value of the sample/hold circuit 7 at a predetermined level (read level), 9 a disk-reflected light receiving element made up of a plurality of receiving optics for receiving light reflected from the disk, and 10 a current-voltage conversion circuit for converting an output current of the disk-reflected light receiving element 9 into a voltage.

In this embodiment, the controller 1 and the auto read power controller 8 are arranged on the main board (stationary side) of the optical disk drive, while the semiconductor laser drive circuit 3-1 incorporating a write strategy, the semiconductor laser diode 4, the light receiving elements 5, 9, the current-voltage conversion circuits 6, 10, and the sample/hold circuit 7 are mounted on an optical head. A control signal to the optical head and input/output signals to/from the optical head are connected through the flexible cable 2 to the main board.

The write strategy-incorporated semiconductor laser drive circuit 3-1 has the following constitutional elements. Designated 12 is a mark & space length detector which detects a mark length, a space length and a mark-space switch timing based on a NARZ signal supplied from the controller 1 and a recording clock chCLK supplied from the write strategy & HF on/off control circuit 13-1 described later. Denoted 13-1 is a write strategy & HF on/off control circuit which multiplies a clock CLK supplied from the controller 1 to generate a recording clock chCLK and, based on an output signal from the mark & space length detector 12, outputs a control signal HF1_cont for controlling the on/off of superimposition of a high-frequency component and control signals OUTE_Pw, OUTE_Per, OUTE_Pb for selecting from among output levels of the semiconductor laser diode 4 (record power output level Pw, erase power output level Per, bias power level Pb). A semiconductor laser driver 14, in response to the control signal OUTE_Pw, OUTE_Per, OUTE_Pb, adds up a current corresponding to the output level Pw, Per, Pb and a current corresponding to a current Iapc_in from the auto read power controller 8 and outputs the resultant sum. A high frequency component generation circuit (HFM) 15-1 generates a high-frequency component corresponding to a frequency FREQ and an amplitude AMP. A frequency setting register (FREQ1 register) 17-1 sets a frequency of the high-frequency component. An amplitude setting register 18-1 sets an amplitude AMP1 of the high-frequency component. A HF control logic 21-1 generates a signal that on/off-controls an output of the high frequency component generation circuit (HFM) 15-1 according to the control signal HF1_cont supplied from the write strategy & HF on/off control circuit 13-1 and a control signal /WR (H=Read, L=Write) supplied from the controller 1. An adder 16 adds up output currents from the semiconductor laser driver 14 and the high frequency component generation circuit (HFM) 15-1. A serial interface circuit 11 converts serial data from the controller 1 into parallel data for setting in registers in the write strategy-incorporated semiconductor laser drive circuit 3-1.

Figure 6:
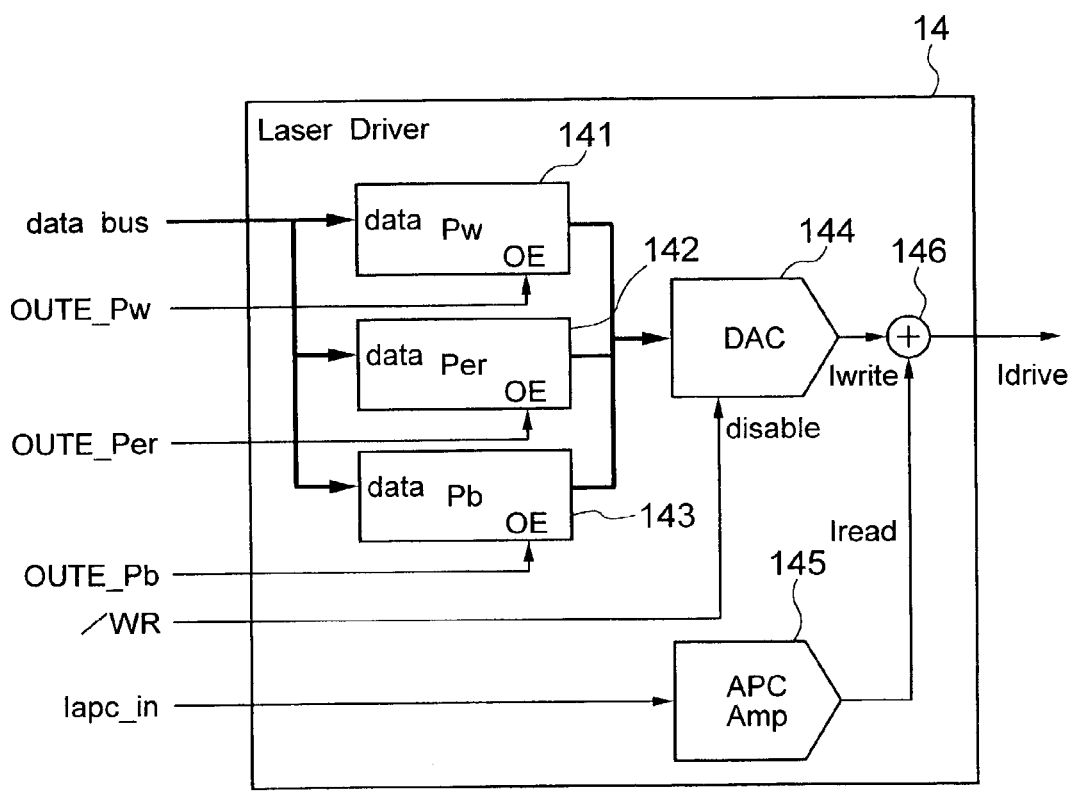
FIG. 6 illustrates a configuration of a semiconductor laser driver 14.

Now, the configurations and operations of individual circuits in the first embodiment will be explained. FIG. 6 shows a configuration of the semiconductor laser driver 14. Denoted 141 is a Pw register for setting an output Pw of the semiconductor laser diode 4, 142 a Per register for setting an output Per, and 143 a Pb register for setting an output Pb. Reference number 144 represents a recording current DA conversion circuit, 145 a current amplifier for amplifying an input current Iapc_in and outputting a current Iread, and 146 an adder which adds up an output current Iwrite of the recording current DA conversion circuit 144 and an output current Iread of the current amplifier 145. The Pw register 141, Per register 142 and Pb register 143 each have an OE (output enable) terminal, which is controlled by the control signal OUTE_Pw, OUTE_Per, OUTE_Pb supplied from the write strategy & HF on/off controller 13-1. One of these register outputs is enabled by the control signal and supplied to the recording current DA conversion circuit 144. The recording current DA conversion circuit 144 outputs a current corresponding to the input value to drive the semiconductor laser diode 4 through the adder 146. Further, the recording current DA conversion circuit 144 has its output disabled (output current=zero) when the control signal /WR (H=Read, L=Write) is in a read mode. The set values of the Pw register 141, Per register 142 and Pb register 143 are set by the controller 1 through the serial interface circuit 11.

Figure 5:
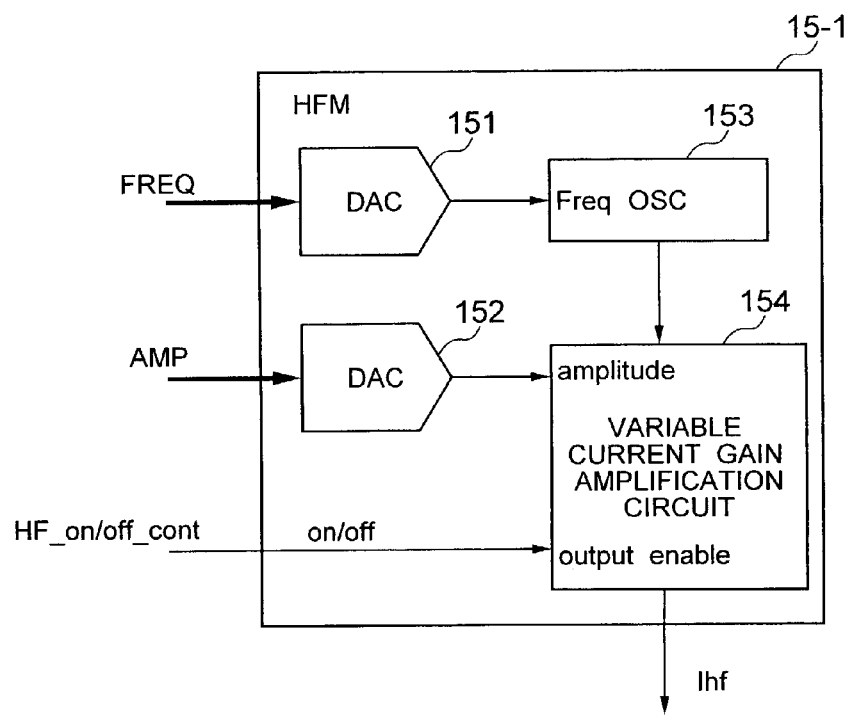
FIG. 5 illustrates a configuration of a high-frequency component generation circuit (HFM) 15-1.

FIG. 5 shows a configuration of the high-frequency component generation circuit (HFM) 15-1. Designated 151 is a frequency setting DA conversion circuit for outputting a control voltage or control current corresponding to the FREQ signal (output of the FREQ1 register 17-1) that sets a frequency of a high-frequency component. An amplitude setting DA conversion circuit 152 outputs a control voltage or control current corresponding to the AMP signal (output of the AMP1 register 18-1) that sets an amplitude of a high-frequency component. Denoted 153 is a high-frequency component oscillation circuit for generating a high-frequency component. The oscillation frequency of the high-frequency component oscillation circuit 153 is controlled by the output of the frequency setting DA conversion circuit 151. A variable current gain amplification circuit 154 current-amplifies the output of the high-frequency component oscillation circuit 153. If we let this output current be Ihf, the current amplitude of Thf is controlled by the output of the amplitude setting DA conversion circuit 152.

The variable current gain amplification circuit 154 has its output current on/off-controlled (enabled or disabled) by the control signal HF_on/off_cont supplied from the write strategy & HF on/off controller 13-1. When HF_on/off_cont is high, the variable current gain amplification circuit 154 outputs the current Ihf (on) and, when the control signal is low, cuts off the current (off).

Figure 7:
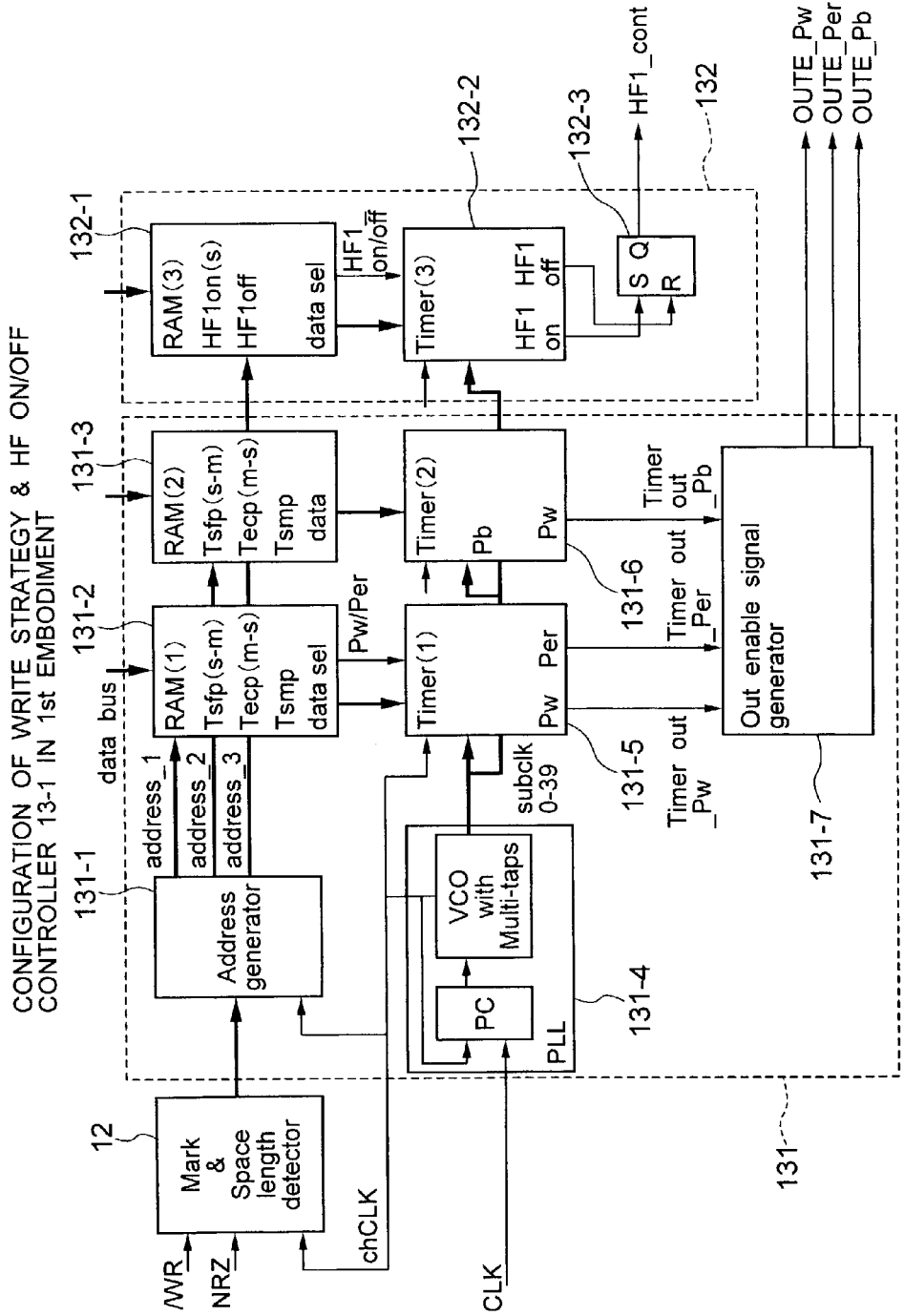
FIG. 7 illustrates a configuration of a write strategy & high frequency superimposition control circuit 13-1 in the first embodiment.

FIG. 7 shows a configuration of the write strategy & HF on/off controller 13-1 in the first embodiment. The write strategy & HF on/off controller 13-1 comprises a write strategy circuit 131 and a first high frequency superimposition control circuit 132.

The write strategy circuit 131 is comprised of the following constitutional elements. Denoted 131-4 is a PLL (phase-locked loop) having a phase comparator and a VCO (voltage controlled oscillator) with taps. The phase comparator performs a frequency comparison and a phase comparison between the clock CLK from the controller 1 and the output signal chCLK from the tapped VCO and, based on detected errors, controls the oscillation frequency and phase of the output signal of the tapped VCO. The output signal chCLK of the tapped VCO constitutes a recording clock. The tapped VCO has 40 variable delay elements to form an open loop to construct an oscillation circuit (ring oscillator). An output of each variable delay element is output as a tap. Suppose that the tap outputs range from subclk0 to subclk 39. Then, a time difference between subclk n and subclk n+1 is one-fortieth of the cycle Tw of the recording clock chCLK. The sub-clocks subclk0–39 are supplied to a timer described later so that the OUTE_Pw, OUTE_Per, OUTE_Pb and HF1_cont signals can be controlled in units of Tw/40.

An address generator 131-1 outputs a predetermined address signal address_1, address_2, address_3 for each cycle Tw of the recording clock chCLK according to the result of detection by the mark & space length detector 12. These address signals are supplied as addresses for RAM(1) 131-2 and RAM(2) 131-3 and also for RAM(3) 132-1 of the first high frequency superimposition control circuit 132.

Figure 19:
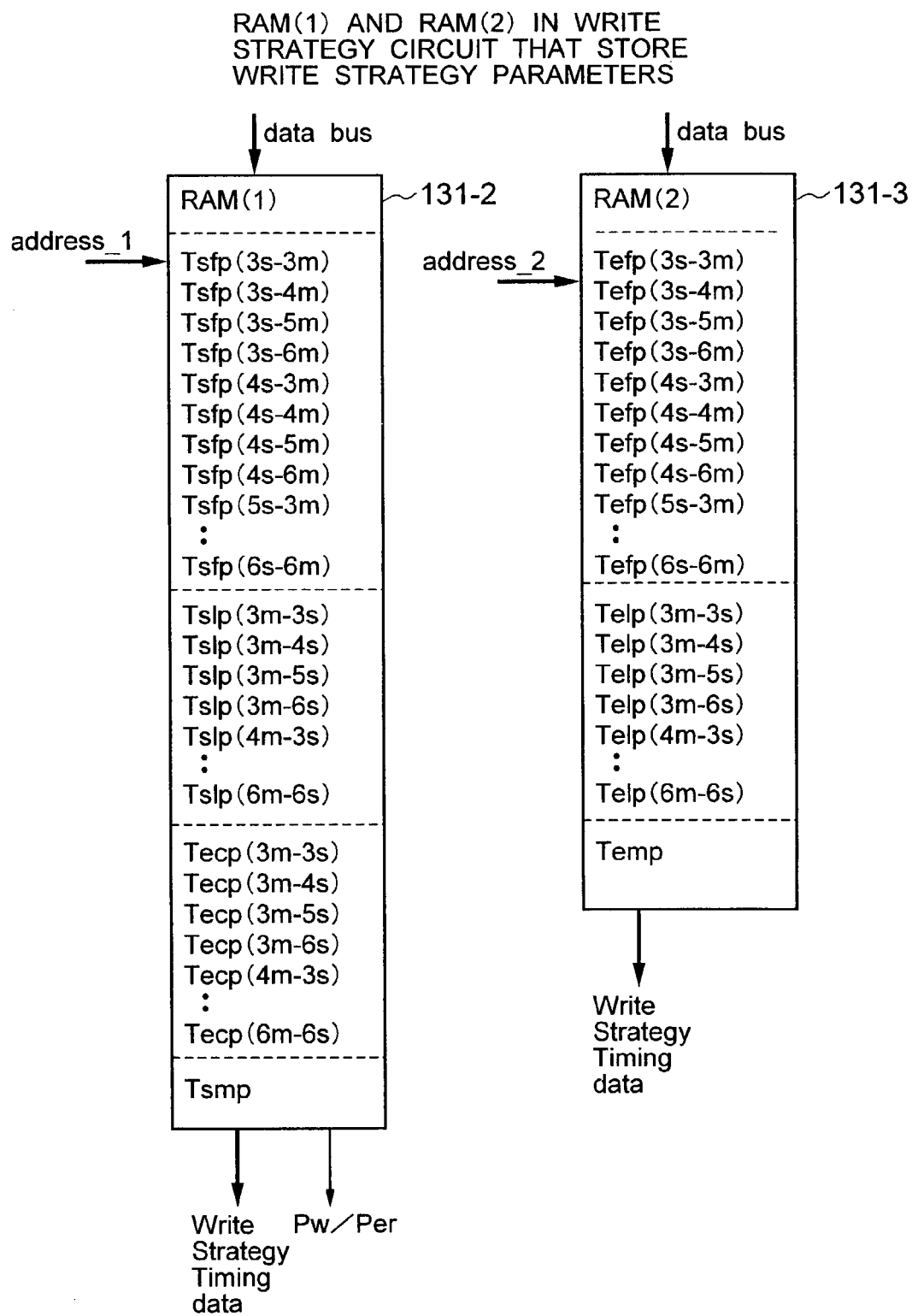
FIG. 19 illustrates a RAM(1) and a RAM(2) to store write strategy parameters of a write strategy circuit.

RAM(1) 131-2 and RAM(2) 131-3 are random access memories to store write strategy parameters. In this embodiment, as shown in FIG. 19, RAM(1) 131-2 stores a total of 49 parameters that break down into 16 parameters each for Tsfp (timing for start of first pulse), Tslp (timing for start of last pulse) and Tecp (timing for end of cooling pulse) and one parameter for Tsmp (timing for start of multi-pulse).

Tsfp parameters comprise 16 parameters that are combinations of four kinds of preceding space length 3T, 4T, 5T and 6T or longer and four kinds of mark length to be recorded 3T, 4T, 5T and 6T or longer. Here, Tsfp(3s–4m) denotes a timing of the start of first pulse (a time from a predetermined reference timing) when the preceding space length is 3T and the mark length to be recorded is 4T. Similarly, Tslp(4m–5s) denotes a timing of the start of last pulse (a time from the predetermined reference timing) when the mark length to be recorded is 4T and the subsequent space length is 5T.

RAM(2) 131-3 stores a total of 33 parameters which break down into 16 parameters each for Tefp (timing for end of first pulse) and Telp (timing for end of last pulse) and one parameter for Temp (timing for end of multi-pulse). Tefp (3s–4m) denotes a timing of the end of first pulse when the preceding space length is 3T and the mark length to be recorded is 4T. Telp (4m–5s) indicates a timing of the end of last pulse when the mark length to be recorded is 4T and the subsequence space length is 5T.

RAM(1) 131-2 and RAM(2) 131-3 select parameters that correspond to the address signals address_1, address_2 and output timing data. The timing data represents a time in units of Tw/40 which elapses from a predetermined reference timing.

Tsfp means that the power is to be changed to Pw after the set timing, and Tefp means that the power is to be changed to Pb after the set timing. Likewise, Tslp indicates a power transition to Pw, Telp a transition to Pb, Tecp a transition to Per, Tsmp a transition to Pw, and Temp a transition to Pb. Thus, RAM(1) 131-2 outputs a signal Pw/Per, which indicates a power transition to Pw or Per, according to the parameter selected by the address_1. The timing parameters in RAM(2) 131-3 all indicate the power transition to Pb and thus RAM(2) 131-3 does not output a signal corresponding to Pw/Per.

When an address value entered corresponds to a timing parameter, RAM(1) 131-2 and RAM(2) 131-3 output a value of the addressed timing parameter. However, when an address for other than the timing parameter is entered, these RAMs output data=00h.

Timer(1) 131-5 checks whether the timing data supplied from RAM(1) 131-2 has a value of 00h. If the value is found to be 00h, no operation is started. If the value is other than 00h, an internal timer is started and outputs a Time_out signal at the corresponding timing.

A built-in timer clocks the set timing based on chCLK (Tw cycle) and subclk0–39 (Tw/40 step).

When the timing data is not 00h and the Pw/Per signal indicates Pw (for example, Tsfp), the Timer(1) 131-5 outputs a Time_out_Pw signal from a Pw output terminal. When the Pw/Per signal indicates Per (for example, Tecp), the timer outputs a Time_out_Per signal from its Per output terminal. Likewise, Timer(2) 131-6 also checks whether the timing data from RAM(2) 131-3 is 00h or not. When the timing data is found to be not 00h, an internal timer is started to output a Time_out_Pb signal at the corresponding timing.

An output enable signal generator 131-7 generates control signals OUTE_Pw, OUTE_Per and OUTE_Pb based on the Time_out_Pw, Time_out_Per and Time_out_Pb signals supplied from the Timer(1) 131-5 and Timer(2) 131-6. Upon receiving Time_out_Pw signal, the output enable signal generator enables OUTE_Pw (high) and disables other control signals (low). Upon receiving Time_out_Per signal, it sets OUTE_Per high and other control signals low. Similarly, when it receives Time_out_Pb signal, the output enable signal generator sets OUTE_Pb high and other control signals low. By enabling one output enable signal and disabling others in this way, one of power levels (Pw, Per, Pb) is selected.

An operation timing of the write strategy circuit 131 will be detailed by referring to FIG. 22. FIG. 22 shows the operation when recording a CD-RW or DVD-RW disk. The write strategy circuit 131 produces a desired semiconductor laser drive current by setting appropriate timing parameters according to a medium to be recorded. In the case of CD-RW and DVD-RW the timing parameters are set in the most complex manner and can operate most effectively. In the case of CD-R, it is possible to obtain a desired semiconductor laser drive current by the operation of only particular timing parameters. Therefore, we will explain the operation timing of the write strategy circuit 131 when recording a CD-RW or DVD-RW disk.

In FIG. 22, (1) represents a recording clock chCLK, (2) a /WR signal, and (3) an internal timing signal of the write strategy circuit 131 which is produced by delaying the NRZI signal (H=Mark, L=Space) supplied from the controller 1 a predetermined duration of time (in units of Tw). (4) denotes a desired semiconductor laser drive current. (10-1) represents an operation of the Timer(1) 131-5 and (10-2) indicates an operation of the Timer(2) 131-6. (11-1) denotes a Time_out_Pw signal, (11-2) a Time_out_Per signal and (11-3) a Time_out_Pb signal. (5-1) denotes an OUTE_Pw control signal, (5-2) an OUTE_Per control signal and (5-3) an OUTE_Pb control signal.

In FIG. 22, a 3T section spanning from T3 to T5 and a 4T section spanning from T9 to T12 correspond to marks, as shown at (3). The write strategy circuit 131 operates based on the delayed NRZI signal shown at (3).

As indicated at (10-1) of FIG. 22, Timer(1) 131-5 takes in timing data of Tsfp at the start of T2 period, timing data of Tslp at the start of T4 period and timing data of Tecp at the start of T5 period. These timing data are valid data other than 00h. Similarly, at the start of each of T8, T10, T11 and T12 periods, the timer takes in valid data of Tsfp, Tsmp, Tslp and Tecp. At other than the above T periods invalid data of 00h are supplied from RAM(1) 131-2, but they are not taken in.

When Tsfp of valid data (not 00h) is taken in at the start of T2 period, the internal timer is started. At the timing that matches the timing data (in units of Tw/40), Time_out_Pw signal is output as shown at (11-1). In this figure the operation of the internal timer is shown with an arrow. An originating end of the arrow represents the start of the timer and a terminating end represents a time-out. As shown at (11-1) and (11-2), when Timer(1) 131-5 times out, it outputs a Time_out_Pw pulse signal and a Time_out_Per pulse signal.

Similarly, Timer(2) 131-6 takes in valid data of Tefp, Telp, Tefp, Temp and Telp at the start of T2, T4, T8, T10 and T11 periods as shown at (10-2) and starts its internal timer. At timings matching the timing data, the timer outputs Time_out_Pb signal as shown at (11-3).

Here, Tsfp, Tefp, Tslp, Teip and Tecp are parameter values that correspond to combinations of a preceding space length, a mark length and a subsequent space length. For simplicity, combination values of mark and space are not shown in the figure.

While FIG. 22 shows an example operation for the mark lengths of 3T and 4T, the following changes are made for other mark lengths. For example, in the case of a mark length of 5T, a multi-pulse state (Tsmp, Temp) is inserted for a 1T duration as shown at T10 period. In the case of a 6T mark, the multi-pulse state is inserted for a 2T duration. As the mark length increases, the multi-pulse state is repetitively inserted and, from a 2T time before the end of the mark of delayed NRZI, is followed by (Tslp, Telp) state and (Tecp) state.

The output enable signal generator 131-7, in response to the time-out signals indicated at (11-1), (11-2) and (11-3), enables the corresponding power control signal (high) and disables other control signals (low) to select the corresponding output level (Pw, Per, Pb) as shown at (5-1), (5-2) and (5-3).

The control signals OUTE_Pw, OUTE_Per, OUTE_Pb are supplied to the semiconductor laser driver 14 to change the output current of the laser driver.

Figure 8:
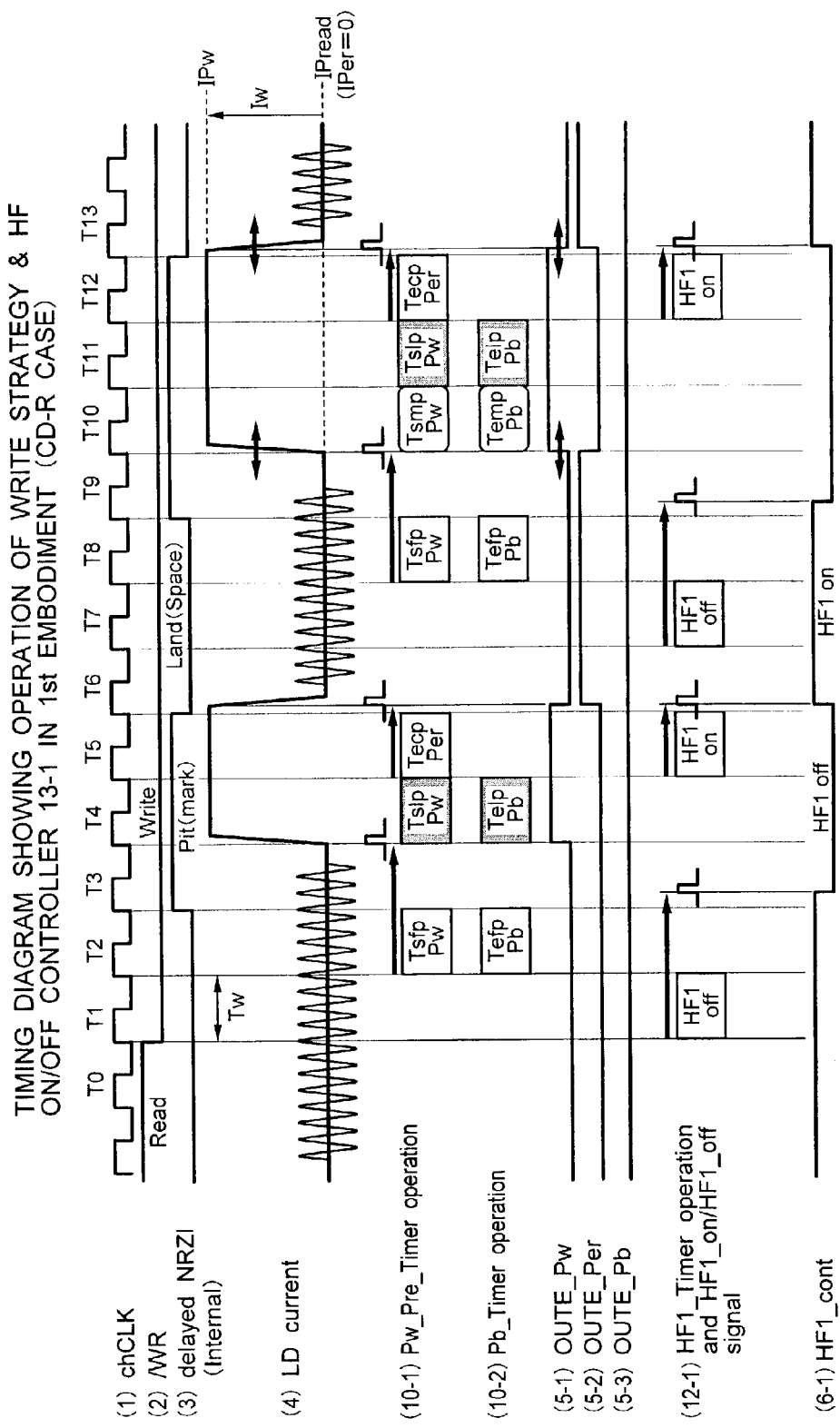
FIG. 8 illustrates a timing diagram (in the case of CD-R) showing an operation of the write strategy & high-frequency superimposition control circuit 13-1 in the first embodiment.

FIG. 8 shows an operation and operation timing of the write strategy circuit 131 in the first embodiment. In the figure, (1), (2) and (3) represent a recording clock chCLK, a /WR signal and a delayed NRZI signal, as in FIG. 22. (4) indicates a desired semiconductor laser drive current during the CD-R recording. (10-1) and (10-2), as in FIG. 22, show the operations of Timer(1) 131-5 and Timer(2) 131-6. Of timing parameters shown in FIG. 8, those shown in italic represent invalid data whose value is 00h and thus have no timer operation arrow.

In the case of CD-R recording, single recording pulses form marks as indicated at (4). The start timing and end timing of the mark forming semiconductor laser drive current are finely adjusted according to a combination of mark and space lengths to adjust the recording current waveform so that the mark on the disk has a desired length and desired start and end positions. This adjustment is done by changing the set value of the timing parameter according to a combination of mark and space lengths. As a result, as shown at (10-1), Tsfp and Tecp timing parameters are made valid data and other parameters are all made invalid data, which is 00h.

Tsfp corresponds to the start timing of the mark recording current and Tecp corresponds to the end timing of the mark recording current.

When Timer(1) 131-5 times out for the Tsfp parameter, it outputs a Time_out_Pw pulse signal. When Timer(1) 131-5 times out for Tecp, it outputs a Time_out_Per pulse signal. In response to these time-out signals, the write strategy circuit 131 outputs OUTE_Pw and OUTE_Per signals as shown at (5-1) and (5-2).

FIG. 7 shows a configuration of the first high frequency superimposition control circuit 132. RAM(3) 132-1 is similar to the above-described RAM(1) 131-2 and RAM(2) 131-3 and stores high frequency superimposition start and end timing parameters HF1_on and HF1_off. RAM(3) 132-1 is controlled by an address signal address_3 supplied from the address generator 131-1 and outputs the corresponding stored address value as timing data. Depending on whether address_3 represents an address value of HF1_on or an address value of HF1_off, RAM(3) 132-1 outputs a HF1_on/off signal.

Timer(3) 132-2 has the same configuration as Timer(1) 131-5. Timer(3) 132-2 clocks a set time based on the subclock of subclk0–39 (in Tw/40 steps) and the recording clock chCLK (Tw cycle), both supplied from PLL 131-4. When the set value is reached (i.e., timed out), the timer outputs a pulse. For the timing data of HF1_off, when, after the internal timer has started, the set timing is reached, the Timer(3) 132-2 times out and outputs a pulse from HF1_off terminal. For the timing data of HF1_on, when, after the internal timer has started, the set timing is reached, the Timer(3) 132-2 times out and outputs a pulse from HF1_on terminal. The timing data of HF1_on and HF1_off are set values in units of Tw/40 as described earlier in connection with the write strategy circuit 131.

Denoted 132-3 is an RS flip-flop, which is set by a pulse from the HF1_on terminal and reset by a pulse from the HF1_off terminal. An output of the RS flip-flop 132-3 constitutes the HF1_cont signal.

Operation timings of the first high frequency superimposition control circuit 132 are shown at (12-1) and (6-1) of FIG. 8. In this embodiment, at a start of T1 period for example, the HF1_off timing parameter is taken into Timer (3) 132-2 to start its internal timer. In this embodiment, prior to the Tsfp timing (start timing of the mark recording current), the superimposition of a high-frequency component is stopped. Therefore, the timing at which to take in the HF1_off timing parameter is advanced 1T from that for Tsfp. Since the superimposition of a high-frequency component is initiated after the timing of Tecp (timing for ending the mark recording current), the timings at which to take in Tecp and HF1_on timing parameters are set equal. As shown at (6-1), the time-out for HF1_off causes the HF1_cont signal to be reset (low) and the time-out for HF1_on causes it to be set (high).

Figure 9:
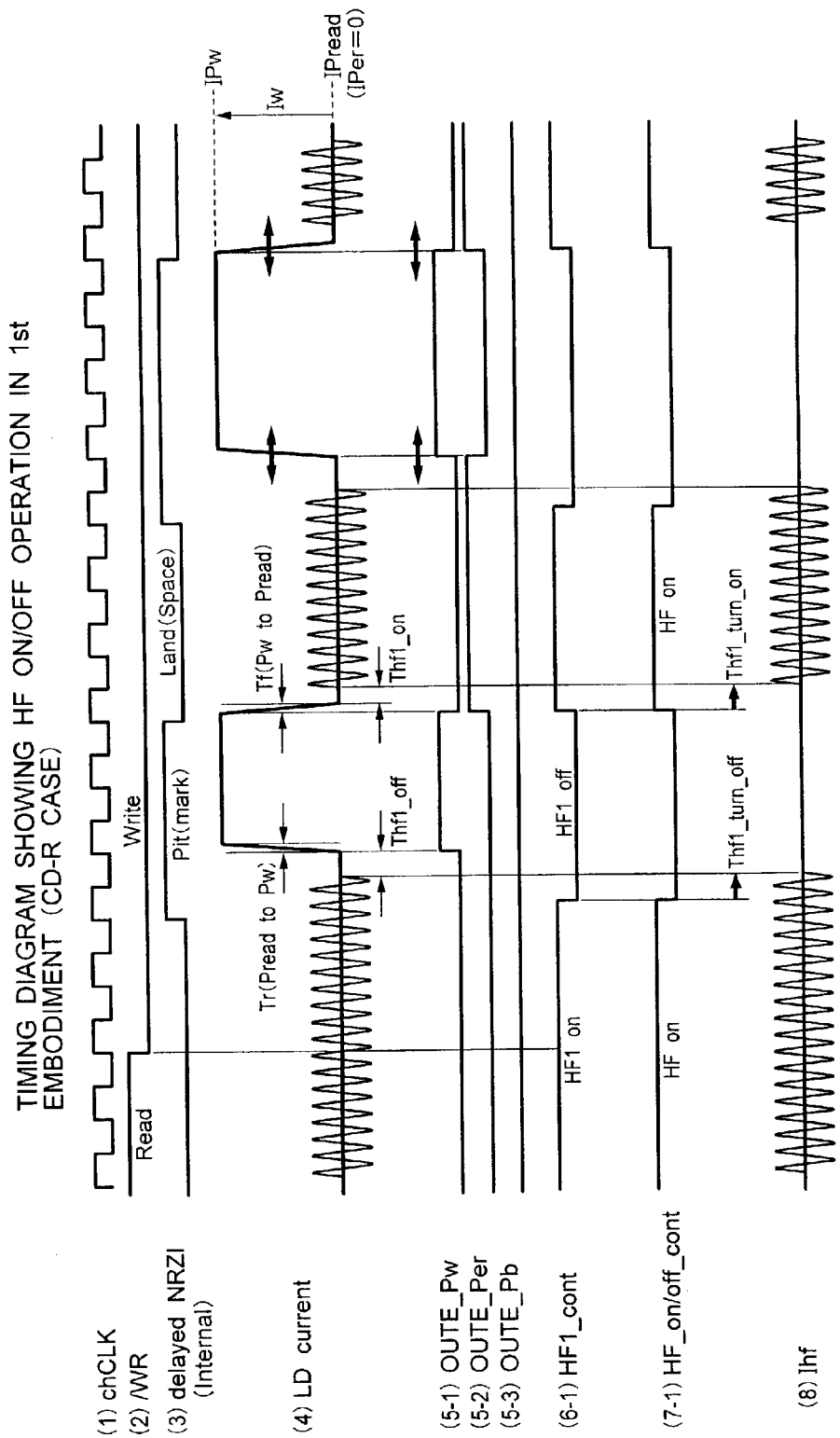
FIG. 9 illustrates a timing diagram (in the case of CD-R) showing a high frequency on/off operation in the first embodiment.

FIG. 9 shows a HF on/off control operation in the first embodiment. (1), (2), (3), (4), (5) and (6-1) in FIG. 9 are the same as those of FIG. 8. When OUTE_Pw is high, the semiconductor laser drive current is set to IPw (a current value obtained by selecting the Pw register and adding the read current Iread to the recording current Iw). When OUTE_Per is high, the semiconductor laser drive current is set to IPread (a current value obtained by selecting the Per register and adding Iread to the recording current Ier). In the case of CD-R, the setting value of the Per register is set to 00h to have Ier=0 and thereby make the current Iread during normal playback and the current Iread+Ier in the space period during recording equal.

(7-1) is a HF_on/off_cont signal generated by the HF control logic 21-1 based on the HF1_cont signal and /WR. This signal executes an on/off control on the output current of the high-frequency component generation circuit (HFM) 15-1. (8) shows how the output current Ihf of the high-frequency component generation circuit (HFM) 15-1 is turned on or off. Here, control delay times of the output current Ihf with respect to the HF_on/off_cont signal are shown as Thf1_turn_off and Thf1_turn_on. Normally, the on-off control of large currents (on the order of several tens of mA) results in some control delay.

Thf1_off time shown at (4) indicates a time which elapses from the high-frequency component Ihf being cut off to the mark recording start timing (leading edge of OUTE_Pw). Thf1_on indicates a time which passes from the mark recording end timing (more precisely, Tf time after the end of OUTE_Pw, where Tf is a mark recording current fall time) to the start of high-frequency component superimposition.

In this embodiment, the value of Thf1_off timing parameter is set considering a range of change of the Tsfp value (mark recording start timing) so that the (Thf1_turn_off+ Thf1_off) time is greater than a predetermined value. Similarly, Thf1_on time is set considering a range of change of the Tecp value (mark recording end timing) so that Thf1_off time is not less than zero. As a result, the Thf1_off time and the Thf1_on time can be set equal to or higher than zero, thus avoiding the mark edge shifting caused by high-frequency component superimposition that is experienced with conventional technologies.

Figure 3:
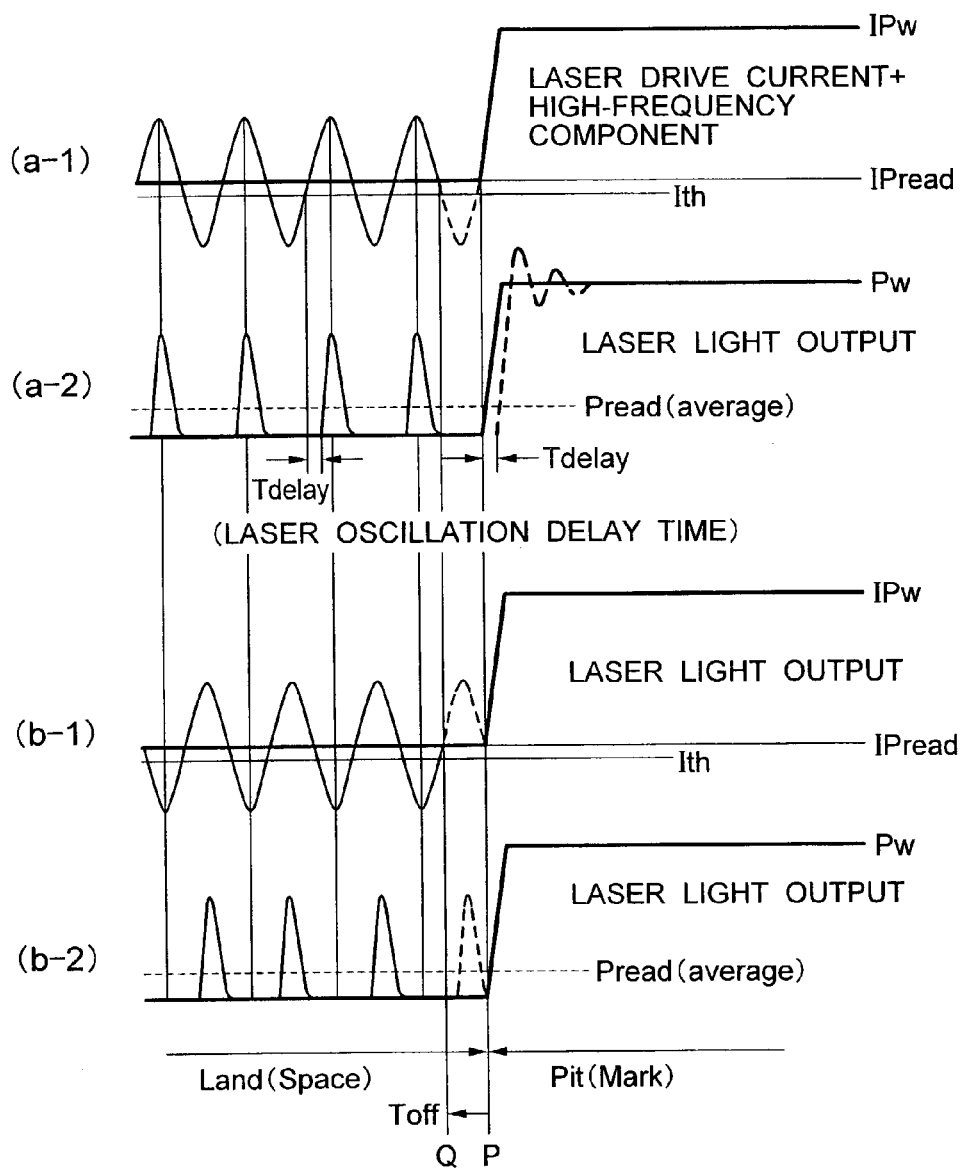
FIG. 3 is diagrams showing how the high-frequency superimposition is stopped a Toff time before the mark forming laser drive current begins to be applied (point P) according to the present invention.

FIG. 3 shows a case where the Thf1_off time is set to more than half a cycle Tosc of a high-frequency component. In this case the superimposition of a high-frequency component is stopped at point Q, rather than at point P. Dotted line in the figure indicates a waveform when the high frequency superimposition is stopped at point P, as shown in FIG. 2. Because the superimposition of the high-frequency component is stopped for the duration between point Q and point P in both cases of (a) and (b), the semiconductor laser drive currents for the Q-to-P period in the two cases are equal, causing the mark forming light output to be started at the same timing. In the case of (a) in FIG. 2, an oscillation was delayed to delay the laser output and in the case of (b) the mark forming light output was initiated without the oscillation delay.

Further, by increasing the Toff time (Thf_off time), it is possible to reduce variations in the supplied light energy at the mark start point that are caused by the phase shift of start timing of the high-frequency component and the mark forming drive current.

Figure 20:
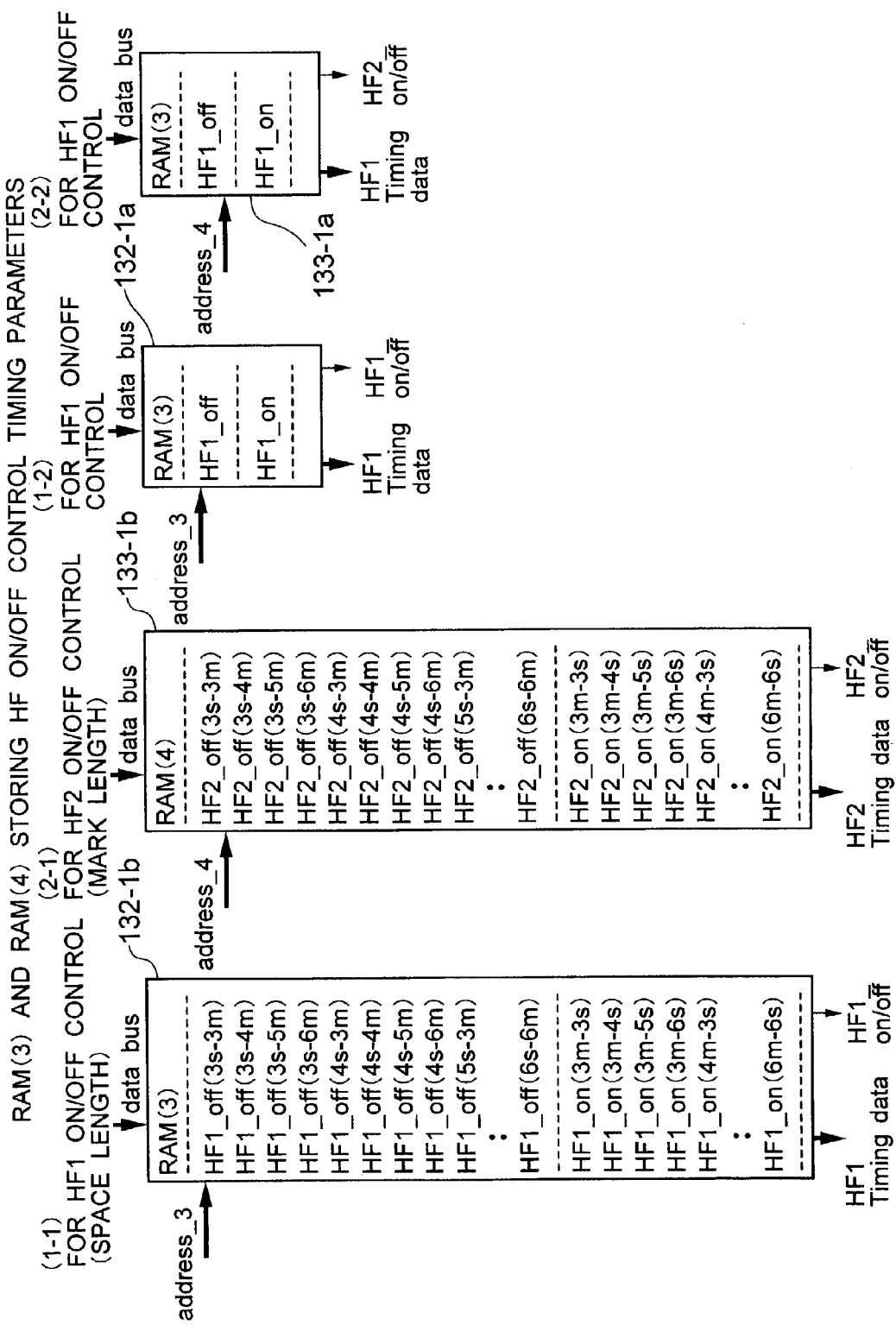
FIG. 20 illustrates a RAM(3) and a RAM(4) to store high frequency control Timing parameters.

In the above example, the parameters stored in RAM(3) 132-1*a* were two timing parameters, HF1_off and HF1_on, as shown at (1-2) of FIG. 20. Hence, changing the mark start timing according to the mark/space lengths results in the high frequency superimposition halt durations, Thf1_on and Thf1_off, being changed. The minimum value of the halt duration needs to be set such that variations in the supplied light energy at the mark leading and trailing edges are small and that the mark edge shifts on the disk are negligible.

As for the HF1_off and HF1_on timing parameters to be stored in RAM(3) 132-1*a*, 16 parameters may be provided for HF1_off according to the combination of a preceding space length and a recording mark length and also 16 parameters for HF1_on according to the combination of a recording mark length and a subsequent space length, as in the case with the timing parameters in the write strategy circuit. At this time, the address signal address_3 for RAM (3) 132-1*a* is supplied from the address generator 131-1 that produces an address value corresponding to the mark/space length, as in the case of RAM(1) 131-2 and RAM(2) 131-3 in the write strategy circuit.

With this arrangement, HF1_off(as–bm) can be set so that the halt time Thf1_off is constant at all times for a particular space/mark length combination corresponding to the set value of Tsfp(as–bm) where "a" represents a space length and "b" represents a mark length. In other words, this can be realized by setting HF1_off(as–bm) so that a difference between the two set values is constant for the same space/ mark length combination. As a result, the effect the high-frequency component has on a leading edge of mark can be made equal for all mark lengths. Similarly, HF1_on(bm–as) can be set so that the halt time Thf1_on is always constant for a particular mark/space length combination corresponding to the set value of Tecp(bm–as). As a result, the effect of the high-frequency component on the trailing edge of mark can be made equal for all mark lengths.

It is also possible to stop the superimposition of a high-frequency component for a particular space length by setting a particular timing parameter value HF1_on(bm–as) to 00h.

For example, when a space length is short, the superimposing of a high-frequency component can be stopped. This allows the Thf1_off and Thf1_on times to be set large even when the space length is short, thereby reducing the influence of the high-frequency component superimposition (variations in the supplied optical energy at the mark leading and trailing edges).

As described above, in the first embodiment, the high frequency superimposition method for superimposing a high-frequency component in a space duration on CD-R involves stopping the high-frequency component superimposition for a Thf1_off time before the start of a mark forming semiconductor laser drive current and then resuming the high-frequency component superimposition a Thf1_on time after the end of the mark forming semiconductor laser drive current. This can avoid adverse effects of the high-frequency component (e.g., overlapping due to control delays of high-frequency component and oscillation delay variations) that occur at the start or end timing of the mark forming semiconductor laser drive current and the mark forming light output. Further reductions in the influences of the high-frequency component (variations in the supplied optical energy at the mark leading and trailing edges) can be realized by increasing Thf1_off and Thf1_on times.

EMBODIMENT 2

A second embodiment represents a case where a high-frequency component is superimposed in space and mark periods during recording. More specifically, the second embodiment controls the start and stop of the superimposition of a high-frequency component in space periods using a first high frequency superimposition control circuit and also controls the start and stop of the superimposition of a high-frequency component in mark periods using a second high frequency superimposition control circuit. Example cases of this embodiment include one in which a CD-R is contemplated to be recorded and played back by superimposing a high-frequency component during space periods and a different high-frequency component during mark periods, and one in which a CD-RW is contemplated to be played back by superimposing a high-frequency component and recorded by superimposing another high-frequency component with different frequency and amplitude in space periods.

Figure 10:
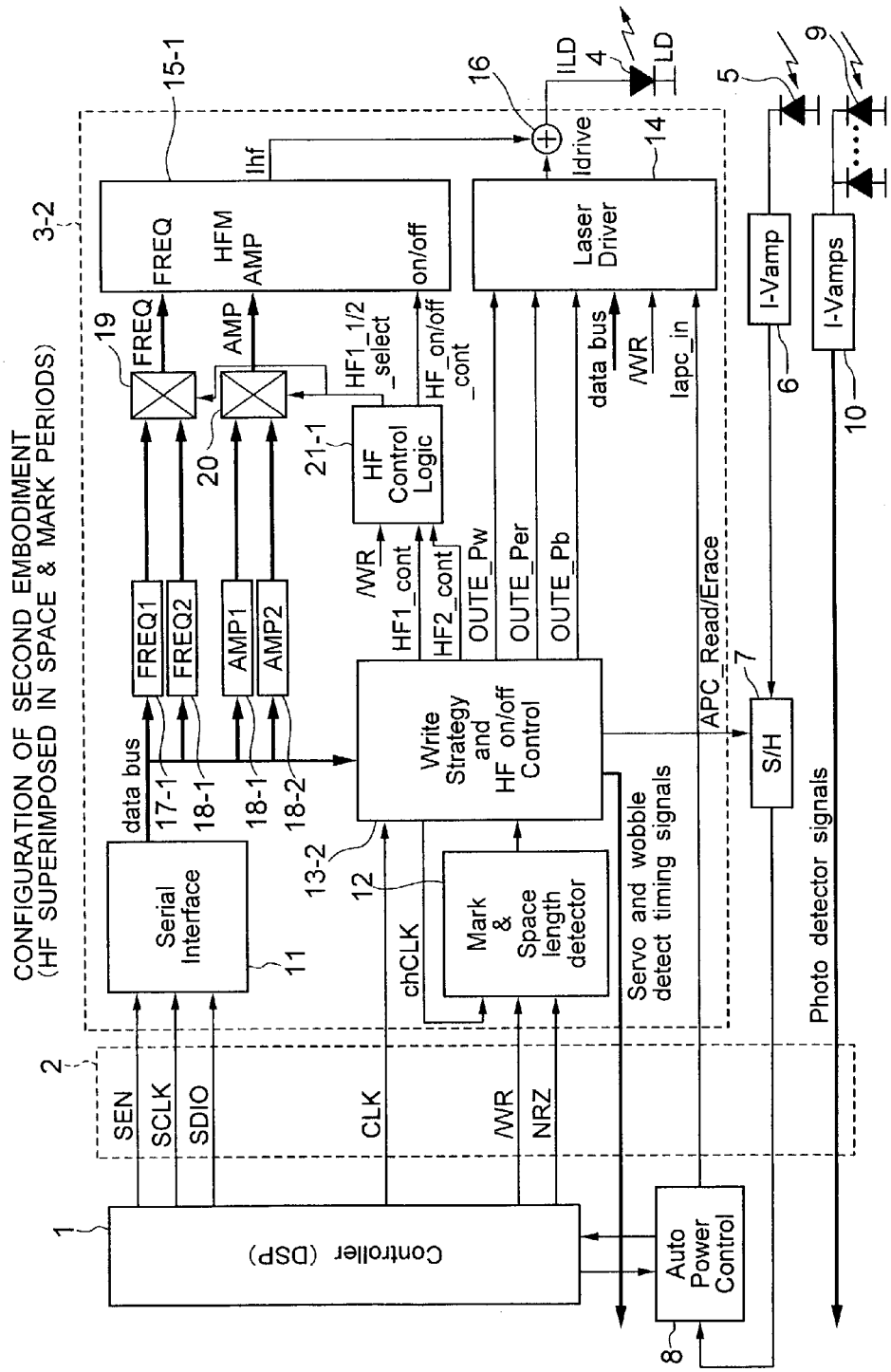
FIG. 10 illustrates a configuration of a second embodiment (where a high frequency is superimposed during space and mark periods).

FIG. 10 shows a configuration of the second embodiment. Elements having identical functions with those of the first embodiment are given like reference numbers. What differs from the first embodiment is that the second embodiment has the following additional elements: an FREQ2 register 17-2 for setting a frequency of a second high-frequency component, a switching circuit 19 for selecting one of FREQ1 register 17-1 and FREQ2 register 17-2, an AMP2 register 18-2 for setting an amplitude of the second high-frequency component, and a switching circuit 20 for selecting one of AMP1 register 18-1 and AMP2 register 18-2. Another difference is that a second HF on/off circuit is added to the write strategy & HF on/off controller 13-1 to form a write strategy & HF on/off controller 13-2 that outputs a HF2_cont signal as well as the HF1_cont signal. Still another difference is that the HF control logic is changed to a HF control logic 21-2 which, based on the /WR signal, the HF1_cont signal and the added HF2_cont signal, outputs a HF_1/2_select signal to control the switching circuits 19, 20 and also outputs a HF_on/off_cont signal to control the start and stop of output of high-frequency component Ihf from the high-frequency component generation circuit (HFM) 15-1.

Figure 11:
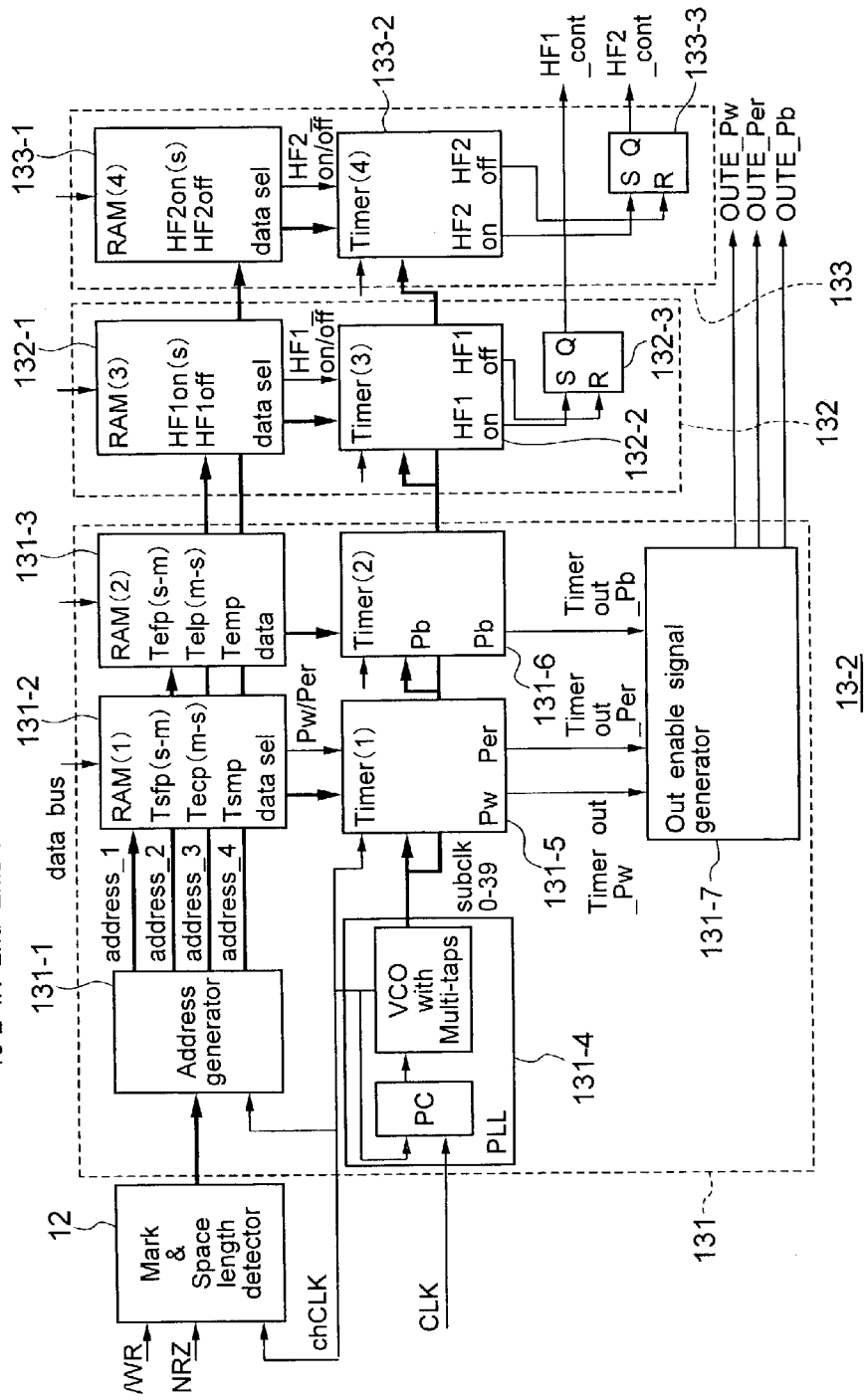
FIG. 11 illustrates a configuration of a write strategy & high frequency superimposition control circuit 13-2 in the second embodiment.

FIG. 11 shows a configuration of a write strategy & HF on/off controller 13-2 of the second embodiment. What differs from the write strategy & HF on/off controller 13-1 of the first embodiment is that a second high frequency superimposition control circuit 133 is added.

As shown in FIG. 11, the second high frequency superimposition control circuit 133 has the same configuration as the first high frequency superimposition control circuit 132. RAM(4) 133-1 stores second HF superimposition start/stop timing parameters HF2_on and HF2_off. In this embodiment, HF2_on and HF2_off parameters each include 16 parameters with different mark/space length combinations, as shown at (2-1) of FIG. 20. HF1_on and HF1_off parameters stored in RAM(3) 132-1 of the first high frequency superimposition control circuit each include 16 parameters with different mark/space length combinations, as shown at (1-1) of FIG. 20.

RAM(4) 133-1, as with RAM(3) 132-1, is controlled by an address signal address_4 supplied from the address generator 131-1 and outputs a HF2_on/off signal depending on whether address_4 is an address value of HF2_on or HF2_off.

Timer(4) 133-2 has the same configuration as the Timer (3) 132-2. Based on the subclock subclk0–39 (Tw/40) and the recording clock chCLK (cycle: Tw) supplied from PLL 131-4, Timer(4) 133-2 clocks a set time and, when the set time is reached (i.e., times out), outputs a pulse. For the HF2_off timing data, when the set timing is reached, Timer (4) 133-2 times out and outputs a pulse from a HF2_off terminal. For the HF2_on timing data, when the set timing is reached, Timer(4) 133-2 times out and outputs a pulse from a HF2_on terminal. HF2_on and HF2_off timing data are set values in units of Tw/40, as with the write strategy circuit 131. Denoted 133-3 is an RS flip-flop, which is set by a pulse from the HF2_on terminal and reset by a pulse from the HF2_off terminal.

Next, an example of the second embodiment as applied to CD-R recording, in which space periods (and read periods) are superimposed with a high-frequency component and mark periods with a different high-frequency component, will be explained.

Figure 12:
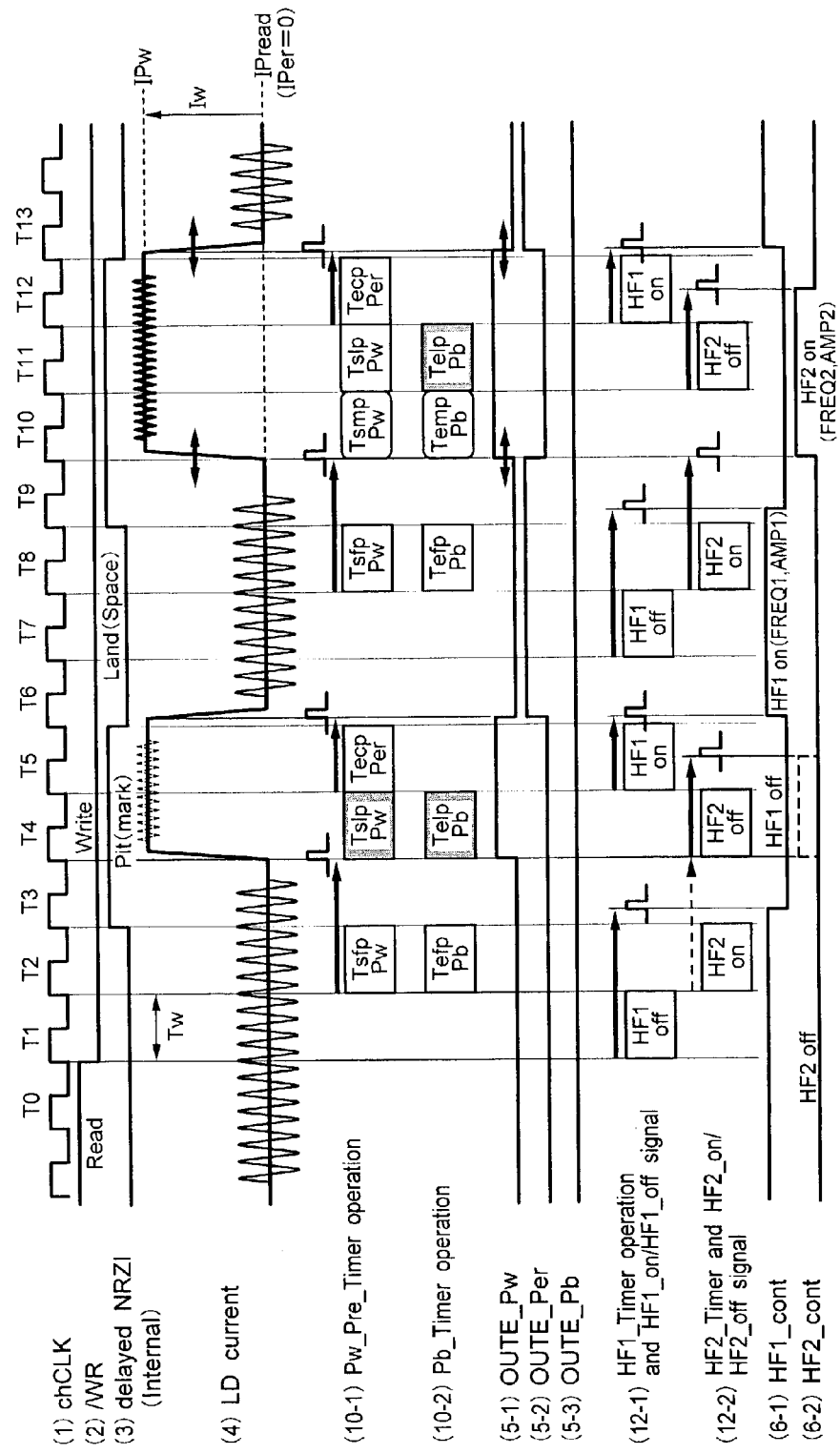
FIG. 12 illustrates a timing diagram (in the case of CD-R) showing an operation of the write strategy & high frequency superimposition control circuit 13-2 in the second embodiment.

FIG. 12 shows an operation timing of the write strategy & HF on/off controller 13-2 when the second embodiment is applied to CD-R recording. What differs from the operation timing of the write strategy & HF on/off controller 13-1 of the first embodiment is that an operation of the second high frequency superimposition control circuit 133 shown at (12-2) in FIG. 12 and its output signal HF2_cont shown at (6-2) are added.

In this embodiment, Timer(4) 133-2 takes in a timing parameter HF2_on at the start of, for example, T2 period and an internal timer is started. The second high frequency superimposition control circuit controls the start/stop of superimposition of a high-frequency component during the mark period. In order to start the high frequency superimposition after the time-out of Tsfp, the HF2_on timing parameter is taken in at the same timing as Tsfp. Since the stopping of a high-frequency component during the mark period is done prior to Tecp (mark recording current end timing), the timing at which to take in the HF2_off timing parameter is advanced 1T from the pickup timing of Tecp.

As shown at (6-2) in the figure, the HF2_cont signal is reset at the time-out of HF2_off (i.e., at the timing of the terminal end of arrow) and is set (high) at the time-out of HF2_on. It is noted that the arrow representing the operation of Timer(4) 133-2 triggered by HF2_on at the start of T2 period is shown as a dotted line. This indicates that Timer(4) 133-2 is made inactive by setting to 00h the value of the HF2_off(as–bm) timing parameter with this mark/space length combination. Setting this timing parameter value to a valid value other than 00h will cause the Timer(4) 133-2 to operate as shown by the dotted line arrow.

This means that whether a particular mark is to be superimposed with a high-frequency component can be controlled by setting the value of HF2_on(as–bm) to 00h or a valid value according to a mark/space length combination. For example, it is possible to perform the high frequency superimposition on only those marks 6T or more long. Further, as in the first embodiment, it is also possible to control whether or not the high frequency superimposition is to be performed on a particular space by setting HF1_on (bm–as) timing parameter value to 00h or a valid data.

Therefore, the high frequency superimposition can be stopped for marks and spaces that are shorter than a predetermined length, thereby reducing adverse effects of the superimposition of high-frequency components (variations of supplied optical energy at mark leading and trailing edges).

Figure 13:
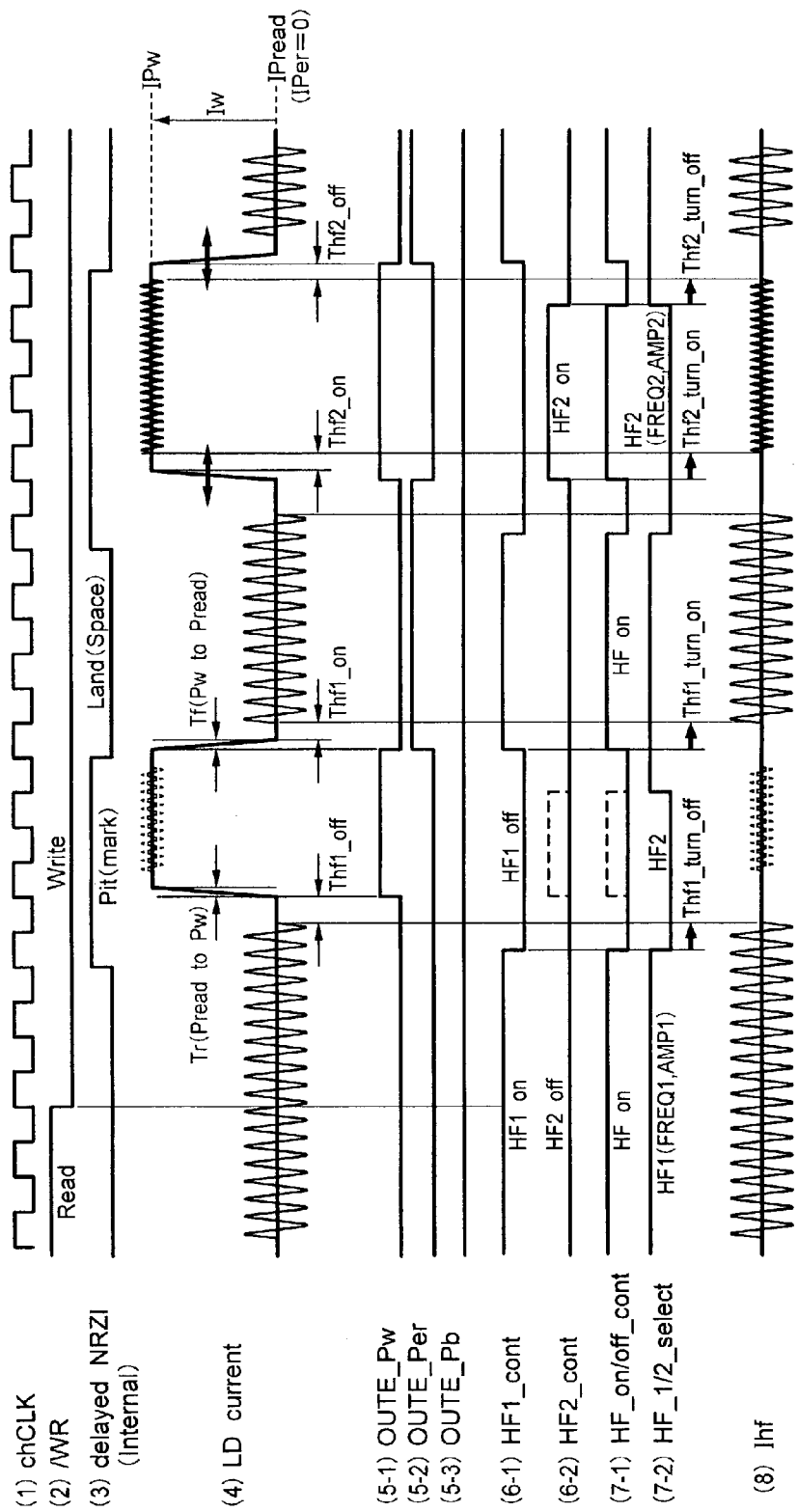
FIG. 13 illustrates a timing diagram (in the case of CD-R) showing a high frequency on/off operation in the second embodiment.

FIG. 13 shows an HF on/off control operation when the second embodiment is applied to CD-R recording. What differs from the first embodiment is that a second high-frequency component is superimposed in mark periods. (1), (2), (3), (5) and (6-1) of FIG. 13 are identical to those of FIG. 9 of the first embodiment. (6-1) represents an output signal HF1_cont of the first high frequency superimposition control circuit 132, and (6-2) represents an output signal HF2_cont of the second high frequency superimposition control circuit 133 which is added in this embodiment. (7-1) and (7-2) are output signals of the HF control logic 21-2 shown in FIG. 10. The HF control logic 21-2 generates a HF_on/off_cont signal shown at (7-1) and a HF_1/2_select signal shown at (7-2) from the HF1_cont, HF2_cont and /WR signals. The HF_on/off_cont signal initiates an on/off control on the output current Ihf of the high-frequency component generation circuit (HFM) 15-1. The HF_1/2_select signal controls the switching circuits 19, 20, as shown in FIG. 10. When it is high, the HF_1/2_select signal selects an output of FREQ1 register 17-1 and an output of amplitude setting register 18-1 to cause the high-frequency component generation circuit (HFM) 15-1 to generate the first high-frequency component. When low, the HF_1/2_select signal selects an output of FREQ2 register 17-2 and an output of AMP2 register 18-2 to cause the high-frequency component generation circuit (HFM) 15-1 to generate the second high-frequency component. Space periods are superimposed with the first high-frequency component and mark periods with the second high-frequency component.

(8) of FIG. 13 shows how the output current Ihf of the high-frequency component generation circuit (HFM) 15-1 is turned on or off. The superimposition of the first high-frequency component in the space periods is performed in the same manner as in the first embodiment. In the super-imposition of the second high-frequency component, the output current Ihf control delay times for the HF_on/off-_cont signal are indicated by Thf2_turn_off and Thf2_turn_on.

A Thf2_off time shown at (4) in the figure represents a time which elapses from the second high-frequency component Ihf being cut off to the mark recording end timing. A Thf2_on time represents a time from the mark recording start timing to the start of the second high-frequency component superimposition.

In the superimposition of the first high-frequency component in space periods, the setting of the HF1_off timing parameter HF1_off(as–bm) to make the (Thf1_turn_off+ Thf1_off) time equal to or greater than a predetermined value and the setting of the HF1_on timing parameter HF1_on(bm–as) to make the Thf1_on time not less than zero are the same as in the first embodiment.

Also in the superimposition of the second high-frequency component in mark periods, the setting value of the HF2_off timing parameter HF2_off(bm–as) is set according to the value of Tecp (marking recording end timing) to make the (Thf2_turn_off+Thf2_off) time not less than a predetermined value. Further, the setting value of the HF2_on timing parameter HF2_on(as–bm) is set according to the value of Tsfp (mark recording start timing) to make the Thf2_on time not less than zero.

As a result, the superimposition of a high-frequency component is stopped for the Thf1_off time preceding the mark recording start timing and for the Thf2_on time following the mark recording start timing. The superimposition of the high-frequency component is also stopped for the Thf2_off time preceding the mark recording end timing and for the Thf1_on following the mark recording end timing.

As described above, in the method of the second embodiment for superimposing different high-frequency components in space and mark periods during CD-R recording, since the high frequency superimposition is stopped for the Thf1_off time and the Thf2_on time before and after the start of the mark forming semiconductor laser drive current and also for the Thf2_off time and the Thf1_on time before and after the end of the mark forming semiconductor laser drive current. This arrangement can eliminate adverse effects of the high-frequency component observed at the start and end of the mark forming semiconductor laser drive current and the mark forming light output (e.g., overlapping due to high-frequency component control delays and variations in oscillation delay). Further reductions in the influences of the high-frequency component (variations in the supplied optical energy at the mark leading and trailing edges) can be realized by increasing the high-frequency component super-imposition halt duration described above.

When the space length is less than a predetermined value, the high frequency superimposition is not performed. This can eliminate adverse effects the high-frequency component has on the subsequent start of the mark forming semiconductor laser drive current when the space length is short. This in turn allows the values of Thf1_off and Thf1_on to be increased, avoiding influences of the high-frequency component.

Further, when the mark length is less than a predetermined value, the high frequency superimposition is not performed. This can eliminate adverse effects of the high-frequency component during the mark forming when the mark length is short. This in turn allows the values of Thf2_off and Thf2_on to be increased, avoiding influences of the high-frequency component superimposed during the mark forming.

Next, another example of the second embodiment as applied to CD-RW recording will be explained, in which read periods and space periods are superimposed with different high-frequency components.

Figure 14:
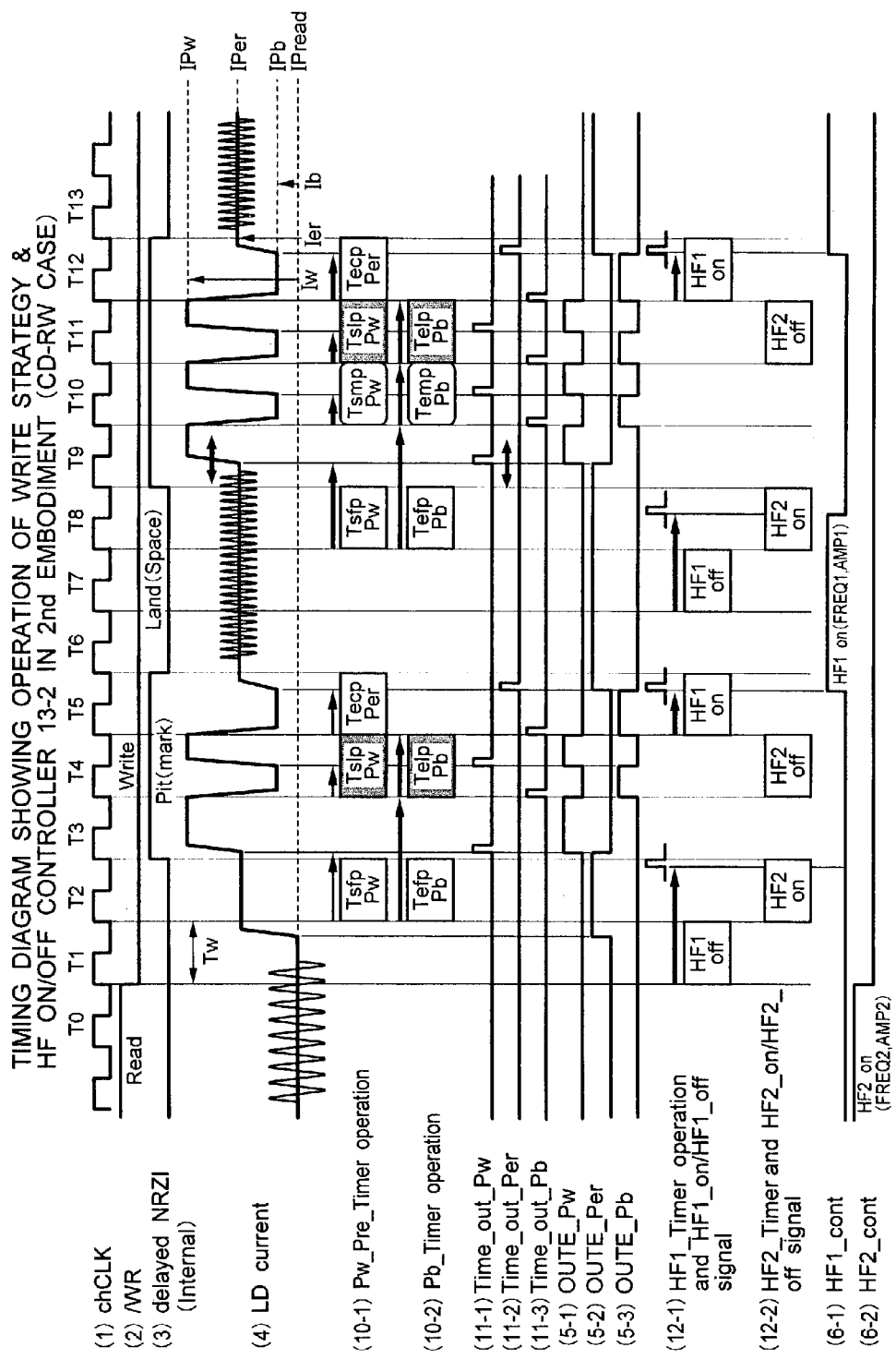
FIG. 14 illustrates a timing diagram (in the case of CD-RW) showing an operation of the write strategy & high frequency superimposition control circuit 13-2 in the second embodiment.

FIG. 14 shows an operation timing of the write strategy & HF on/off controller 13-2 when the second embodiment is applied to CD-RW recording. The operation of the write strategy circuit 131 to obtain a desired semiconductor laser drive current shown at (4) in the figure is shown at (10), (11) and (5). (10-1) represents an operation of Timer(1) 131-5, (10-2) represents an operation of Timer(2) 131-6, (11-1) and (11-2) represent a Time_out_Pw signal and a Time_out_Per signal, respectively, output from the Timer(1) 131-5, and (11-3) represents a Time_out_Pb signal output from the Timer(2) 131-6. An OUTE_Pw signal at (5-1), an OUT-E_Per signal at (5-2) and an OUTE_Pb signal at (5-3) are output signals of the write strategy circuit 131. The operation during CD-RW recording were already detailed.

(12) of FIG. 14 represents an operation of the HF_on/off control circuit of this embodiment. (12-1) shows an operation of the first high frequency superimposition control circuit 132, and (12-2) shows an operation of the second high frequency superimposition control circuit 133. The operation of the first high frequency superimposition control circuit 132 shown at (12-1) is the same as that applied to the CD-R recording described above (FIG. 12).

In this CD-RW case, since the high frequency superimposition is performed only in space periods during recording, the parameter values of their set values HF2_on and HF2_off are all set to 00h to stop the operation of the second HF_on/off control circuit 133 during /WR=L(Write).

What differs from the previous CD-R case is that, as shown at (6-1) and (6-2) of the figure, the level setting of the HF1_cont signal and the HF2_cont signal during the /WR=H(Read) periodiskhanged so that the HF1_cont signal is low (disabled) and the HF2_cont signal is high (enabled) during the /WR=H(Read) period. In the previous CD-R case, the HF1_cont signal is set high (enabled) and the HF2_cont signal low (disabled) during the /WR=H period as shown at (6-1) and (6-2) of FIG. 12, which is opposite the CD-RW case.

The level setting of HF1_cont and HF2_cont during the /WR=H period is made by a HF_cont signal level setting circuit not shown which, based on the /WR signal, sets or resets the RS flip-flops 132-3, 133-3 for outputting the HF1_cont and HF2_cont signals. Which of the RS flip-flops is to be set or reset is determined by the controller 1 setting their mode through the serial interface.

In the preceding CD-R case, this mode setting superimposes the first high-frequency component in the /WR=H (Read) periods and space periods and the second high-frequency component in the mark periods. In the CD-RW case, on the other hand, the mode setting causes the second high-frequency component to be superimposed in the /WR=H(Read) periods and the first high-frequency component to be superimposed in the space periods.

Figure 15:
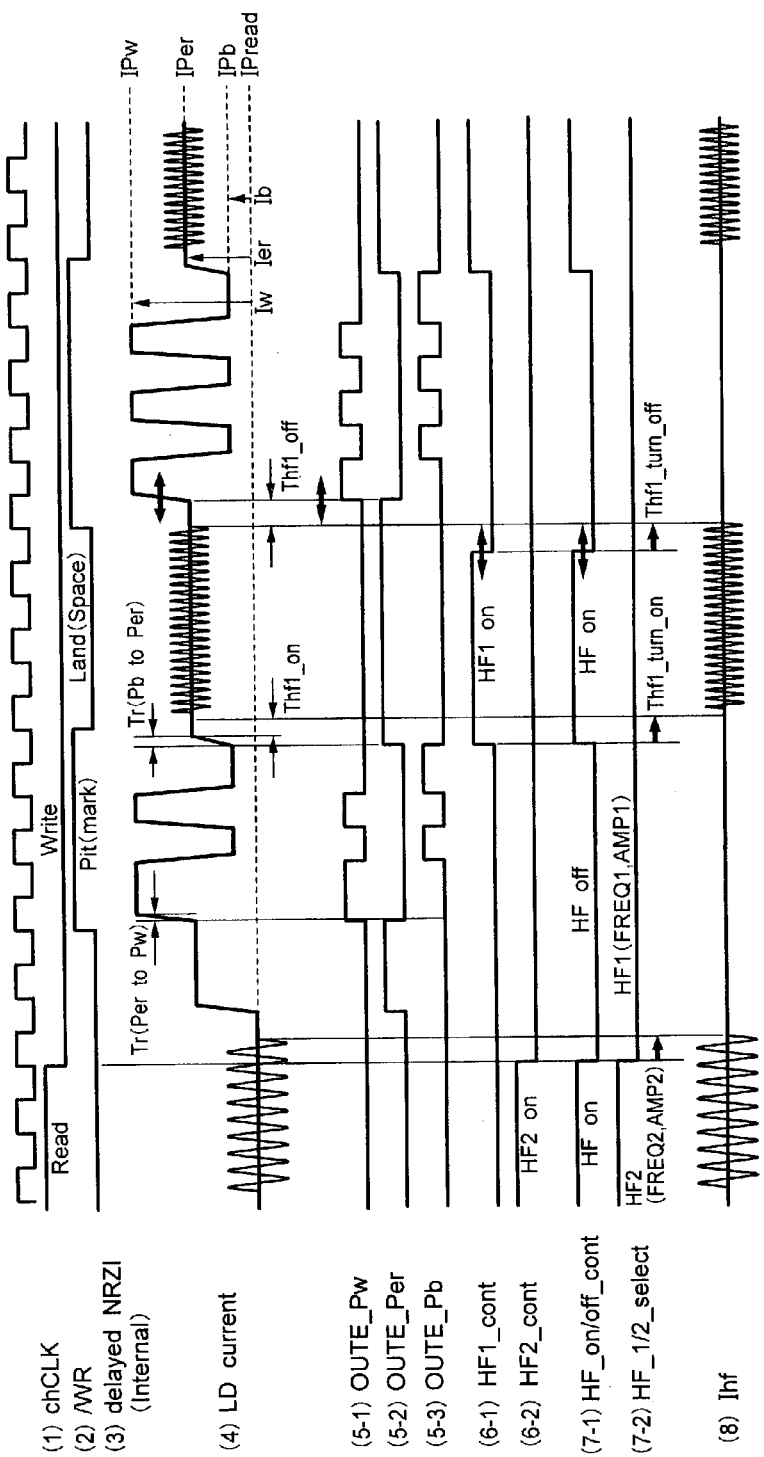
FIG. 15 illustrates a timing diagram (in the case of CD-RW) showing a high frequency on/off operation in the second embodiment.

FIG. 15 shows an HF on/off control operation when the second embodiment is applied to CD-RW recording. (8) in the figure shows an output current Ihf of the high-frequency component generation circuit (HFM) 15-1 as a result of the HF on/off control. The superimposition of the first high-frequency component in the space periods are the same as in the previous CD-R case. The setting to make Thf1_on and Thf1_off more than a predetermined duration is the same as in the CD-R case. It is noted, however, that since a high-frequency component is superimposed on Power Per, the set values of FREQ1 and AMP1, the conditions for the first high-frequency component, are different from those of the high-frequency component for CD-R that is superimposed on the Power Pread.

As described above, in the CD-RW case, too, the second embodiment stops the superimposition of a high-frequency component for a Thf1_off time prior to the start timing of the mark forming semiconductor laser drive current and resumes the high frequency superimposition a Thf1_off time after the end timing of the mark forming semiconductor laser drive current. This arrangement can reduce adverse effects of the high-frequency component (e.g., overlapping due to high-frequency component control delays and variations in supplied optical energy at the mark leading and trailing edges).

EMBODIMENT 3

A third embodiment is characterized in that a high-frequency component is generated by multiplying the clock CLK supplied from the controller and is synchronized with the recording clock and that a multiplier N and a duty of the high-frequency component signal are varied to realize an optimum high frequency superimposition condition.

Figure 16:
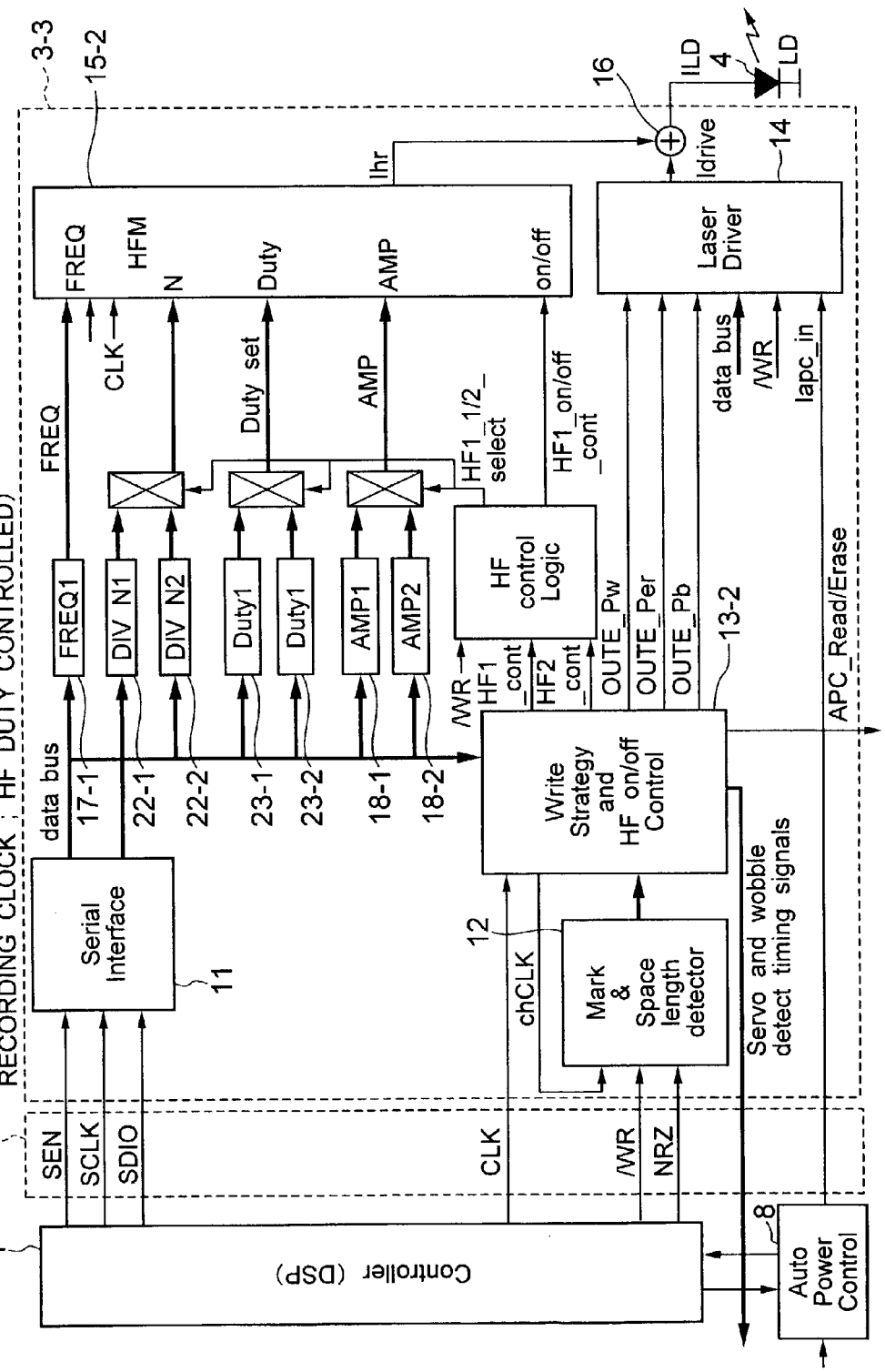
FIG. 16 illustrates a configuration of a third embodiment (where a high frequency is synchronized with a recording clock and a high frequency duty is controlled).

FIG. 16 shows a configuration of the third embodiment. Elements having identical functions with those of the first and second embodiments are given like reference numbers. What differs from the second embodiment is that the internal configuration of the high-frequency component generation circuit (HFM) has been modified (described later). Another difference is that a dividing N1 register 22-1 for setting a first multiplier N1, a dividing N2 register 22-2 for setting a second multiplier N2, and a switching circuit 25 for selecting one of outputs from these registers are added. Still another difference is that a Duty1 register 23-1 for setting a duty of a first high-frequency component signal, a Duty2 register 23-2 for setting a duty of a second high-frequency component signal, and a switching circuit 24 for selecting one of outputs from these registers are added. Yet another difference is that the FREQ2 register 17-2 (FIG. 10) used in the second embodiment for setting the frequency of the second high-frequency component is eliminated so that only the FREQ1 register 17-1 for setting the frequency of the first high-frequency component is used.

Figure 17:
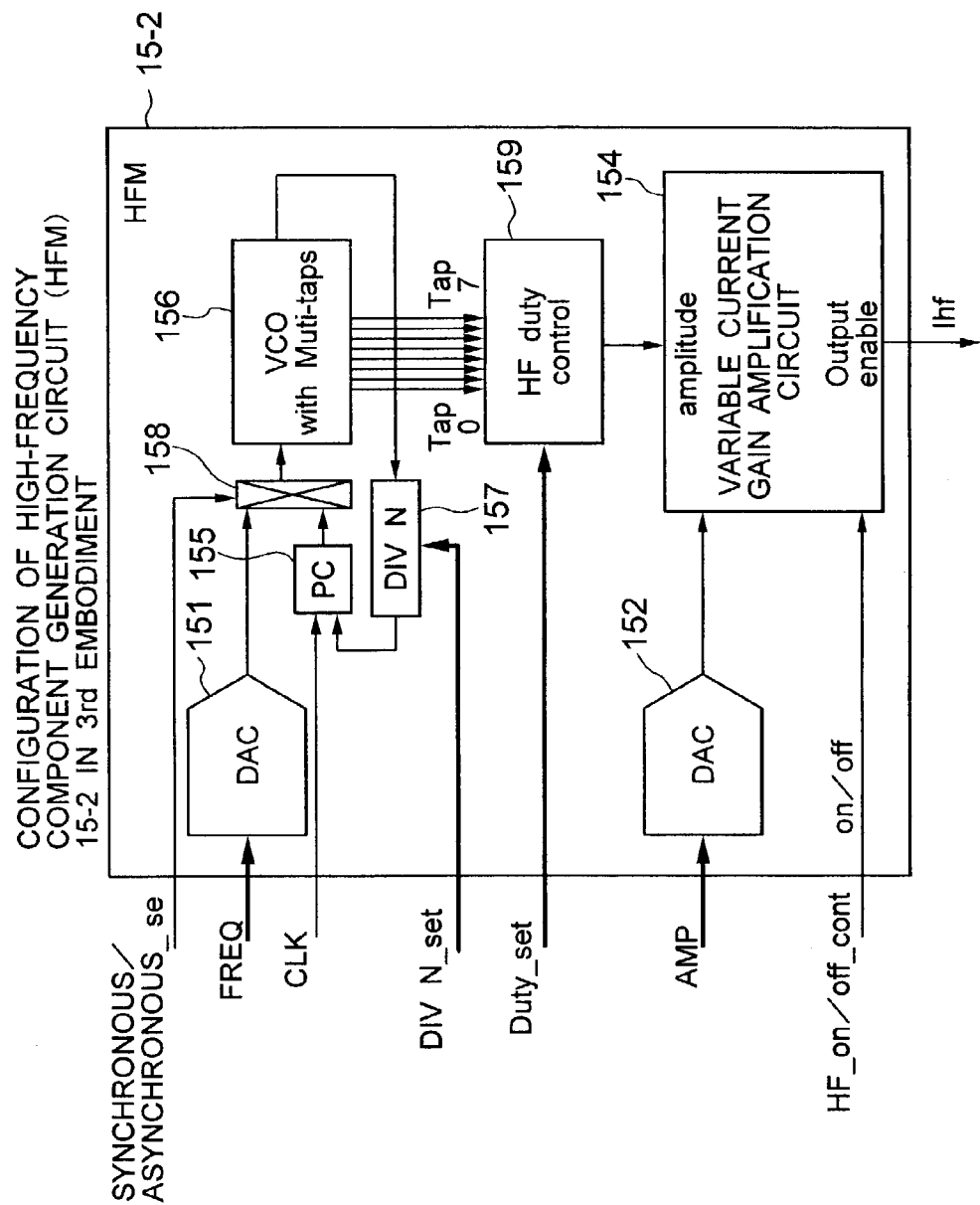
FIG. 17 illustrates a configuration of a high-frequency component generation circuit (HFM) 15-2 in the third embodiment.

FIG. 17 shows a configuration of a high-frequency component generation circuit (HFM) 15-2. Denoted 151 is a frequency setting DA conversion circuit for outputting a control voltage or control current that sets a frequency of the high-frequency component in response to a FREQ1 signal (an output of the FREQ1 register 17-1); and 152 an amplitude setting DA conversion circuit for outputting a control voltage or control current which sets an amplitude of the high-frequency component in response to an AMP signal (an output of the switching circuit 20 (FIG. 16)). This configuration is similar to that of the high-frequency component generation circuit (HFM) 15-1 (FIG. 10) of the first and second embodiment.

A HF phase compare circuit 155 compares the frequency and phase of the output of a HF dividing circuit 157 with the clock CLK supplied from the controller 1. A switching circuit 158 selects one of outputs of the frequency setting DA conversion circuit 151 and the HF phase compare circuit 155. A HF VCO (or ICO: current controlled oscillator) 156 changes the oscillation frequency according to the output voltage or output current from the switching circuit 158. The HF VCO has the same configuration as the tapped VCO which forms the PLL 131-4 used in the write strategy circuit 131. The HF VCO forms a ring oscillator with, for example, eight ring-connected variable delay elements. In response to a Duty_set signal (an output of the switching circuit 24), a HF duty control circuit 159 controls the duty of the high-frequency component signal based on tap output signals Tap_0–Tap_7 of the HF VCO 156. A variable current gain amplification circuit 154 is the same as that used in the high-frequency component generation circuit (HFM) 15-1 described earlier.

Next, the operation of the high-frequency component generation circuit (HFM) 15-2 of the third embodiment will be explained. When the switching circuit 158 selects an output of the frequency setting DA conversion circuit 151 according to the synchronous/asynchronous_sel signal, the HF VCO 156 oscillates at a frequency corresponding to the output value of the FREQ1 register 17-1, as in the first embodiment. If an output of the HF phase compare circuit 155 is selected, the HF VCO 156 oscillates at a frequency corresponding to the output value of the HF phase compare circuit 155. The output signal of the HF VCO 156 is divided by the HF dividing circuit 157. The dividing number N is set by the dividing N1 register 22-1 and the dividing N2 register 22-2. The dividing number N is a positive integer and the oscillation frequency of the HF VCO 156 increases in proportion to N. The N-divided signal is compared with the phase of CLK by the HF phase comparator which outputs a phase difference signal for controlling the oscillation frequency of HF VCO. This arrangement forms a so-called PLL. As a result, the output signal of the HF VCO is synchronized with the clock CLK from the controller 1 and has a frequency N times that of CLK.

The HF VCO 156 uses outputs of eight variable delay elements, which form the VCO, as tap output signals Tap_0 to Tap_7 for transfer to the HF duty control circuit 159.

Figure 18:
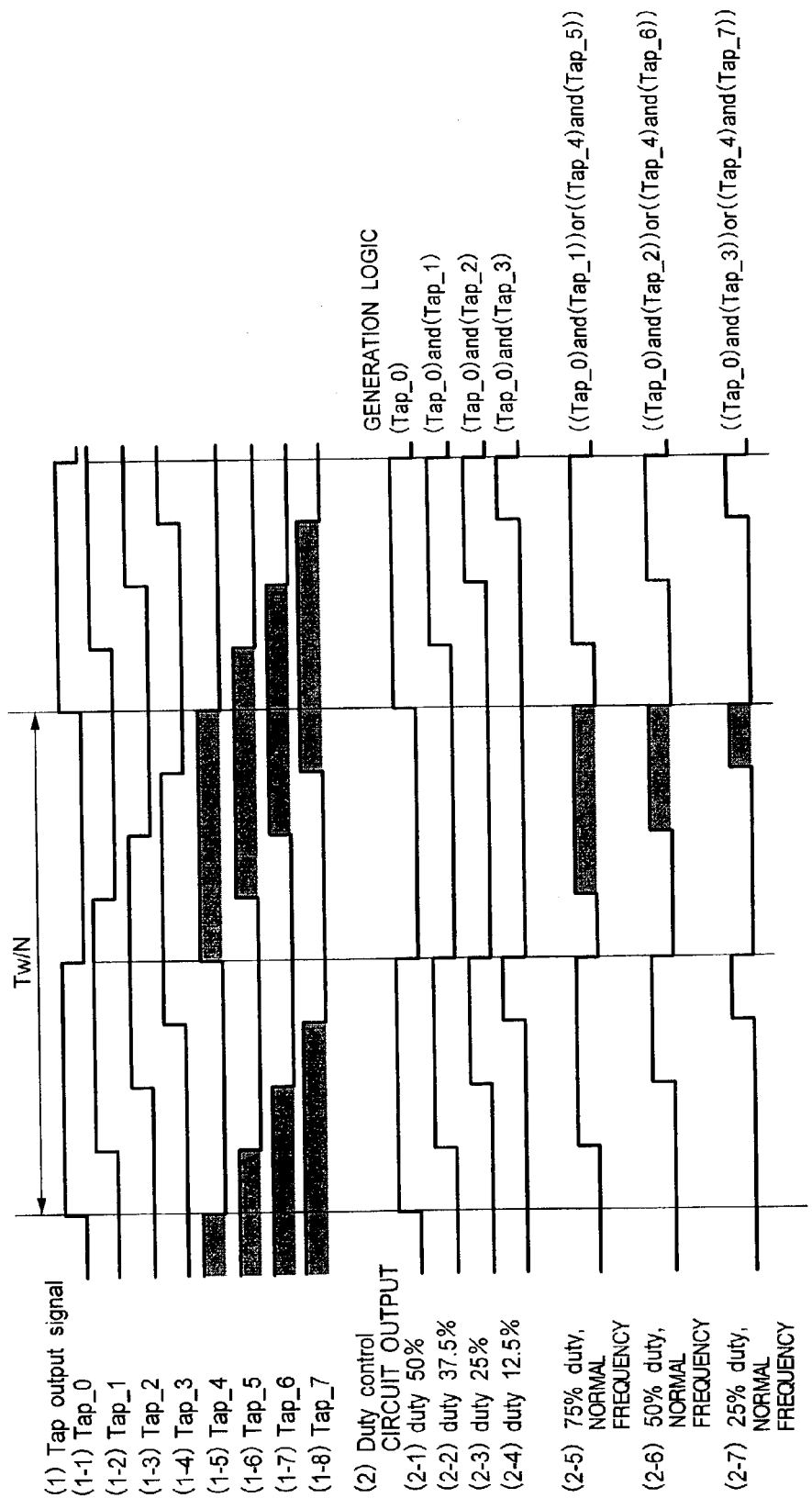
FIG. 18 illustrates a timing diagram showing an operation of the high frequency duty control of the high-frequency component generation circuit (HFM) 15-2 in the third embodiment.

FIG. 18 shows an operation timing of the HF duty control circuit 159. (1) in the figure represents tap signals Tap_0 to Tap_7. (2) represents an example output signal of the HF duty control circuit 159. An output (2-1) is generated by outputting the Tap_0 signal as is and has a duty of 50%. An output (2-2) is generated by performing AND logic on Tap_0 and Tap_1 and has a duty of 37.5%. An output (2-3) is generated by performing AND logic on Tap_0 and Tap_2 and has a duty of 25%. An output (2-4) is generated by performing AND logic on Tap_0 and Tap_3 and has a duty of 12.5%.

Output signals (2-5) to (2-7) are generated by using Tap_4 to Tap_7 signals. (2-5) is a frequency signal with a 75% duty, (2-6) is a frequency signal with a 50% duty and (2-7) is a frequency signal with a 25% duty. Generation logic for these signals are shown in the figure. As shown at (2-5) to (2-7), since high-frequency components can be generated which have two times the oscillation frequency of the HF VCO 156, the variable frequency range can be expanded.

Which of these high-frequency components (2-1) to (2-7) is to be output is selected by the set values of the Duty1 register 23-1 and Duty2 register 23-2 shown in FIG. 16.

By varying the duty of the high-frequency component, the duration of the drive current higher than the oscillation threshold value Ith of the semiconductor laser diode 4, tover, can be varied. This is almost equivalent to changing the tover time by changing the frequency of the ordinary high-frequency component with a 50% duty.

Figure 21:
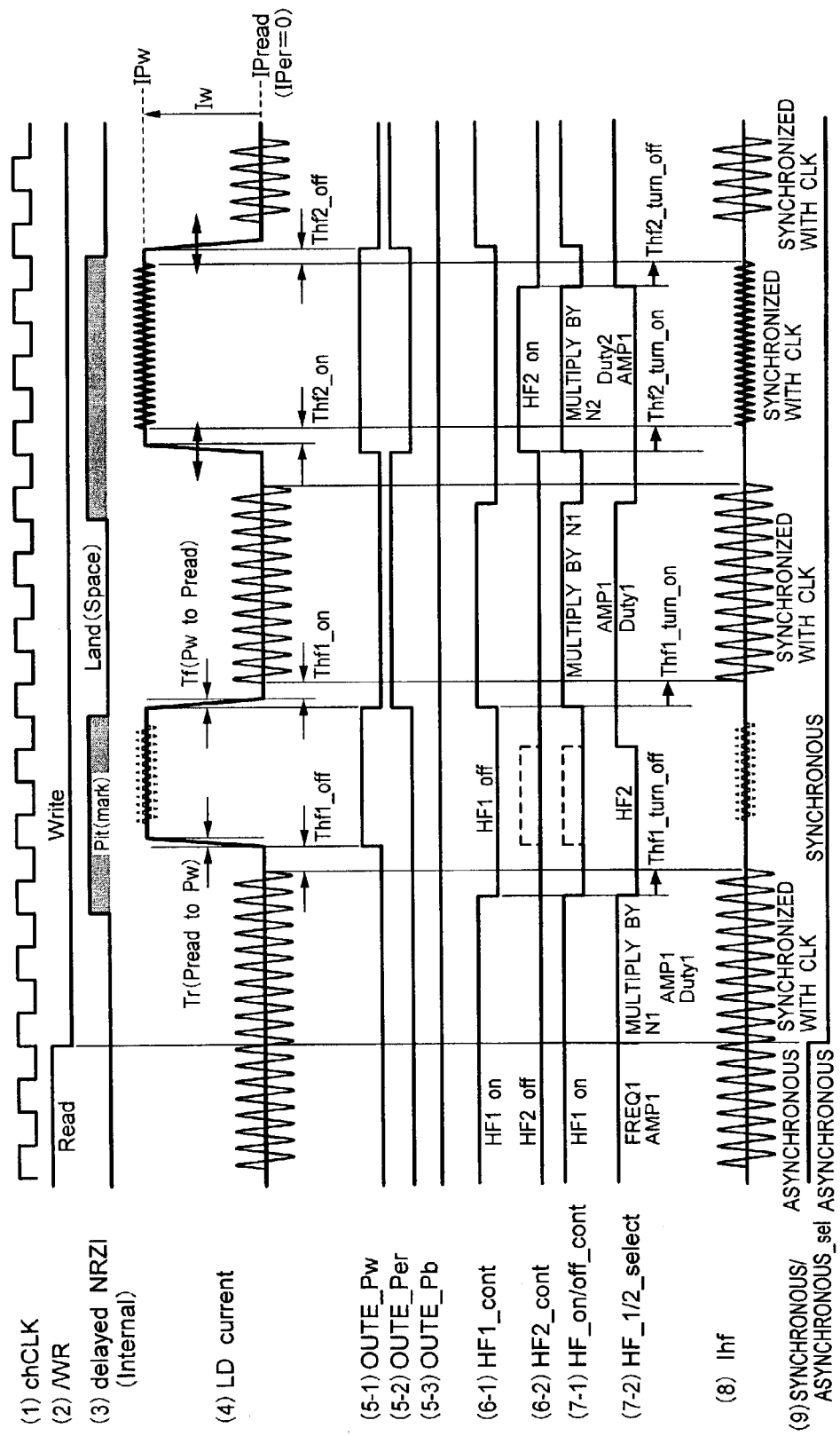
FIG. 21 illustrates a timing diagram (in the case of CD-R) showing a high frequency on/off operation in the third embodiment.

FIG. 21 shows an operation timing when the third embodiment is applied to the above-described CD-R recording in which a high-frequency component is superimposed in space and mark periods. In this example, the synchronous/asynchronous_sel signal as shown at (9) is set high (asynchronous) when the /WR signal is high (Read) and is set low (synchronous with clock) when the /WR signal is low (Write). Hence, during the Read period a high-frequency component with a frequency corresponding to the set value of the FREQ1 register 17-1 is superimposed, as in the conventional technology. During the Write period, the HF VCO 156 is controlled by the HF phase compare circuit 155 and outputs a signal synchronous with the clock signal CLK supplied from the controller 1. The write strategy circuit 131 also operates using the recording clock chCLK which is generated by multiplying the clock signal CLK from the controller 1 by the PLL 131-4. Therefore, the recording clock and the high-frequency component signal are synchronized through CLK.

As shown at (7-1) and (7-2) in FIG. 21, when the HF_on/off_cont signal is high (HF on) and the HF_1/2_select signal is high (HF1), the dividing N1 register 22-1, the Duty1 register 23-1 and the AMP1 register 18-1 are selected and a high-frequency component with the corresponding frequency, duty and amplitude is superimposed on the semiconductor laser drive current by the high-frequency component generation circuit (HFM) 15-2. When the HF_1/2_select signal is low (HF2), the dividing N2 register 22-2, the Duty2 register 23-2 and AMP2 register 18-2 are selected and a high-frequency component with the corresponding frequency, duty and amplitude is superimposed on the semiconductor laser drive current.

The output current Ihf of the high-frequency component generation circuit (HFM) 15-2 is shown at (8) in FIG. 21. (4) shows Ihf superimposed on the semiconductor laser drive current.

As described above, in the third embodiment, since the high-frequency component signal is synchronized with the recording clock, the phase relation between the high-frequency component and the mark recording start and end positions does not change, as it does in the first and second embodiments, and remains constant at all times, with the result that the effects of the high-frequency component on the leading and trailing edges of the mark being formed become constant. Thus, it is possible to avoid variations in the supplied optical energy at the mark recording start and end positions caused by the asynchronous high-frequency component.

Further, in synchronizing the high-frequency component with the recording clock, the multiplier N for the reference clock CLK and the duty of the high-frequency component signal are made variable, allowing an optical output of a desired pulse width to be produced. Therefore, a light pulse that is equivalent to one set at an optimum frequency can be produced. This in turn makes it possible to set an optimum condition equivalent to that obtained by the conventional high-frequency component generation method.

Further, reducing the duty at a lower frequency than is used in the conventional technique can equivalently produce the same effect that is obtained by the superimposition at a higher frequency. This in turn allows the operation frequency of the high-frequency component generation circuit itself to be reduced, compared with conventional methods. Further, by using a high-frequency component with a low frequency, the power consumption and unwanted radiation can be mitigated.

EMBODIMENT 4

In the first to third embodiments, our explanations concerned example cases in which a new HF on/off control timer is provided for each of the first and second high frequency superimposition control circuits. It is also possible to use the timer in the write strategy circuit to equivalently perform the HF on/off control.

Further, during the Read and Per periods the output signal of the write strategy circuit may be used to perform the HF superimposition and, during the space period, the HF stop control may be executed by inserting, prior to the mark recording start timing, a power state (e.g., Pb and Per1) different from that of Per at the same power level as Per.

Similarly, the HF superimposition start control may be done by inserting, for a predetermined duration after the mark recording end timing, a power state (e.g., Pb and Per2) different from that of Per at the same power level as Per. In this case, the HF control logic needs to be formed so that the HF superimposition is executed during the power state of Per and stopped during Pb, Per1 and Per2.

This arrangement allows the HF on/off control to be executed without having to increase the number of timers, thus reducing a size of the timer circuit.

As described above, with this invention, positional variations on a disk of the mark leading and trailing edges caused by the superimposition of a high-frequency component can be eliminated. This in turn prevents jitter-induced degradations during high-speed recording.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An optical disk drive for recording information by forming marks or spaces on an optical disk, comprising:
    drive current generation means for supplying a mark forming semiconductor laser drive current and a space forming semiconductor laser drive current, the mark forming semiconductor laser drive current having a drive waveform corresponding to a mark length and having a plurality of levels of current value, the space forming semiconductor laser drive current having at least one level of current value;
    first high-frequency superimposition means for superimposing a high-frequency component on the space forming semiconductor laser drive current; and
    high-frequency superimposition control means for controlling the first high-frequency superimposition means to stop the superimposition of the high-frequency component for a predetermined duration prior to switching from the space forming semiconductor laser drive current to the mark forming semiconductor laser drive current.

2. An optical disk drive according to claim 1, wherein the high-frequency superimposition control means controls the first high frequency superimposition means to form a space on the optical disk by switching from the mark forming semiconductor laser drive current to the space forming semiconductor laser drive current and, after a predetermined period of time has elapsed from the switching, superimposing the high-frequency component on the space forming semiconductor laser drive current.

3. An optical disk drive according to claim 2, further comprising a mark/space length detection means for detecting a mark length and a space length to be recorded;
    wherein, when the mark length detected by the mark/space length detection means is more than a predetermined value, the high-frequency superimposition control means initiates the superimposition of the high-frequency component a predetermined period of time after switching from the space forming semiconductor laser drive current to the mark forming semiconductor laser drive current.

4. An optical disk drive according to claim 1, further comprising second high-frequency superimposition means for superimposing a high-frequency component on the mark forming semiconductor laser drive current;
    wherein the high-frequency superimposition control means controls the second high frequency superimposition means to form a mark on the optical disk by switching from the space forming semiconductor laser drive current to the mark forming semiconductor laser drive current and, after a predetermined period of time has elapsed from the switching, superimposing the high-frequency component on the mark forming semiconductor laser drive current.

5. An optical disk drive according to claim 4, further comprising mark/space length detection means for detecting a mark length and a space length to be recorded;
    wherein, when the space length detected by the mark/space length detection means is more than a predetermined value, the high frequency superimposition control means initiates the superimposition of the high-frequency component for a predetermined period of time after switching from the mark forming semiconductor laser drive current to the space forming semiconductor laser drive current.

6. An optical disk recording method for recording information which includes marks and spaces on an optical disk by irradiating a laser beam from a laser diode, the method comprising the steps of:
    supplying to the laser diode a space forming laser drive current with high-frequency-superimposing current;
    supplying to the laser diode a space forming laser drive current without high-frequency-superimposing current; and
    supplying to the laser diode a mark forming laser drive current without high-frequency-superimposing current.

7. An optical disk recording method for recording information with includes marks and spaces on an optical disk by irradiating a laser beam from a laser diode, the method comprising the steps of:
    supplying to the laser diode a mark forming laser drive current without high-frequency-superimposing current;
    supplying to the laser diode a space forming laser drive current without high-frequency-superimposing current; and
    supplying to the laser diode a a space forming laser drive current with high-frequency-superimposing current.

* * * * *